United States Patent [19]

Ruehl

[11] Patent Number: 5,264,253

[45] Date of Patent: * Nov. 23, 1993

[54] COATING METHOD AND FACILITY FOR VEHICLE STRUCTURAL COMPONENTS

[75] Inventor: Phillip C. Ruehl, Elm Grove, Wis.

[73] Assignee: A.O. Smith Corporation, Milwaukee, Wis.

[ * ] Notice: The portion of the term of this patent subsequent to Oct. 29, 2008 has been disclaimed.

[21] Appl. No.: 953,047

[22] Filed: Sep. 29, 1992

Related U.S. Application Data

[60] Division of Ser. No. 776,683, Oct. 11, 1991, Pat. No. 5,152,840, which is a continuation of Ser. No. 582,481, Sep. 14, 1990, abandoned, which is a continuation-in-part of Ser. No. 469,253, Jan. 24, 1990, Pat. No. 5,061,528, which is a continuation-in-part of Ser. No. 389,346, Aug. 3, 1989, Pat. No. 5,061,529.

[51] Int. Cl.$^5$ ............................ B05D 1/18; B05C 3/00
[52] U.S. Cl. .................. 427/430.1; 118/423; 118/425; 118/426; 118/428
[58] Field of Search ............... 427/430.1, 443; 118/423, 425, 426, 428

[56] References Cited

U.S. PATENT DOCUMENTS

| | | | |
|---|---|---|---|
| 2,073,576 | 3/1937 | Climenhaga | 118/423 X |
| 2,116,430 | 5/1938 | Gordon | 118/423 |
| 2,119,720 | 6/1938 | Reifsnyder | 118/426 X |
| 2,482,269 | 9/1949 | Grimes | 118/425 X |
| 2,552,612 | 5/1951 | Adams et al. | 118/423 X |
| 2,570,746 | 10/1951 | Bablik | 118/423 X |
| 2,658,008 | 11/1953 | Williams et al. | 118/423 |
| 2,728,686 | 12/1955 | Borushko | 118/423 X |
| 2,852,410 | 9/1958 | Brewer | 118/500 X |
| 2,862,236 | 12/1958 | Shapero | 118/423 X |
| 2,872,893 | 2/1959 | Kling | 118/426 X |
| 2,944,655 | 8/1960 | Griswold | 198/409 |
| 3,056,372 | 10/1962 | Bassett et al. | 118/428 X |
| 3,110,627 | 11/1963 | Weiskopf et al. | 118/426 |
| 3,183,818 | 5/1965 | Pangborn et al. | 118/423 X |
| 3,472,203 | 10/1969 | Coleman | 118/425 |
| 4,407,225 | 10/1983 | Kataishi et al. | 118/425 |
| 4,408,560 | 10/1983 | Caratsch | 118/69 |
| 4,473,604 | 9/1984 | Rollie et al. | 427/444 |
| 4,502,410 | 3/1985 | Donahue | 118/429 |
| 4,560,592 | 12/1985 | Friedland | 427/430.1 |
| 4,834,019 | 5/1989 | Gordon et al. | 118/423 |
| 5,061,529 | 8/1991 | Ruehl | 427/430.1 |

FOREIGN PATENT DOCUMENTS 60-18925 1/1985 Japan .

Primary Examiner—Shrive Beck
Assistant Examiner—David M. Maiorana
Attorney, Agent, or Firm—Andrus, Sceales, Starke & Sawall

[57] ABSTRACT

A manufacturing method and facility for applying a coating to vehicle structural components such as frames, provides unloading and stacking below the unloading station. Oscillation of the vehicle structural component in the coating liquid in the dip tank provides accelerated heat transfer, and also improves coating by eliminating air pockets. A bent carousel arm or a parallelogram linkage provides uniform coating action. Reverse travel sequencing minimizes space requirements.

10 Claims, 27 Drawing Sheets

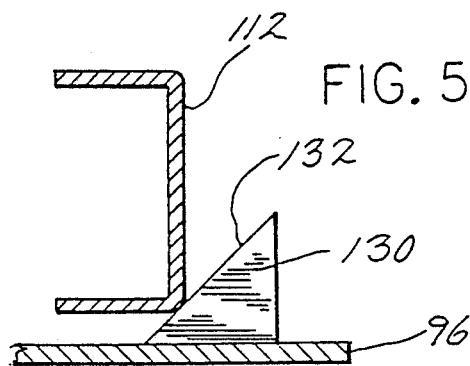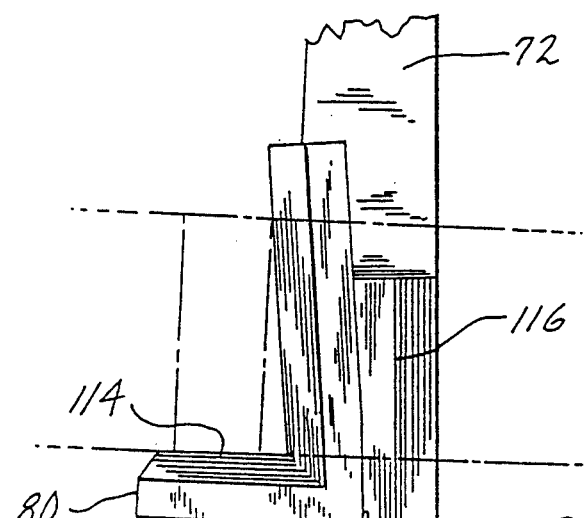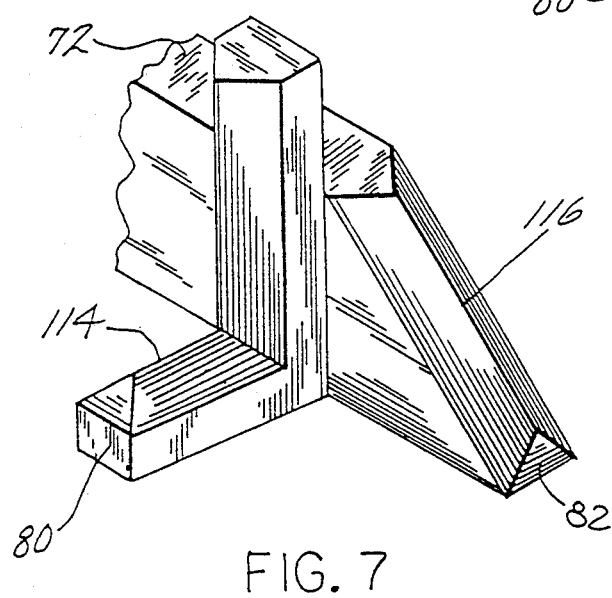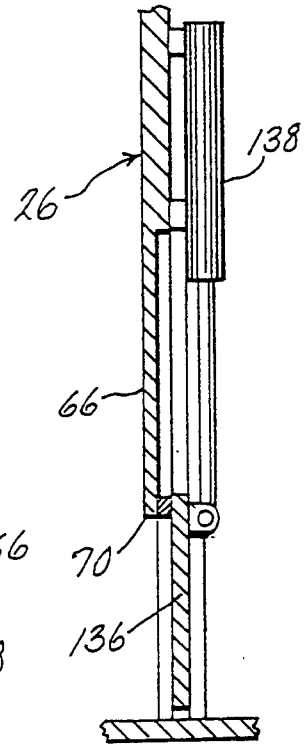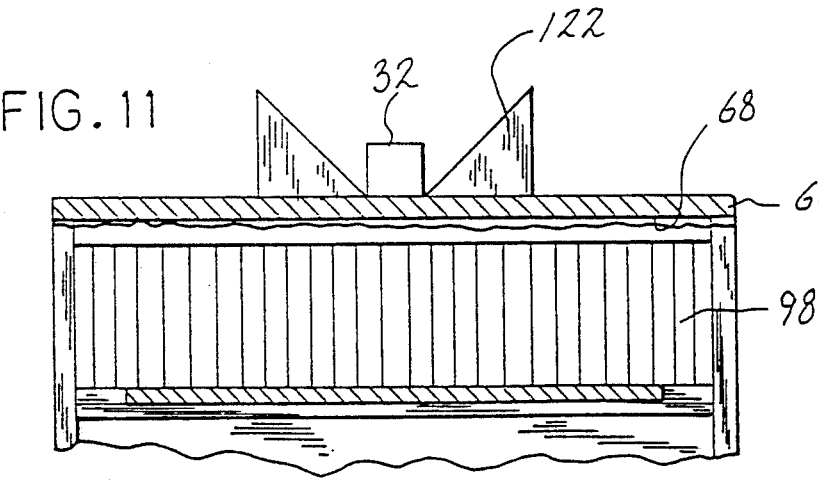

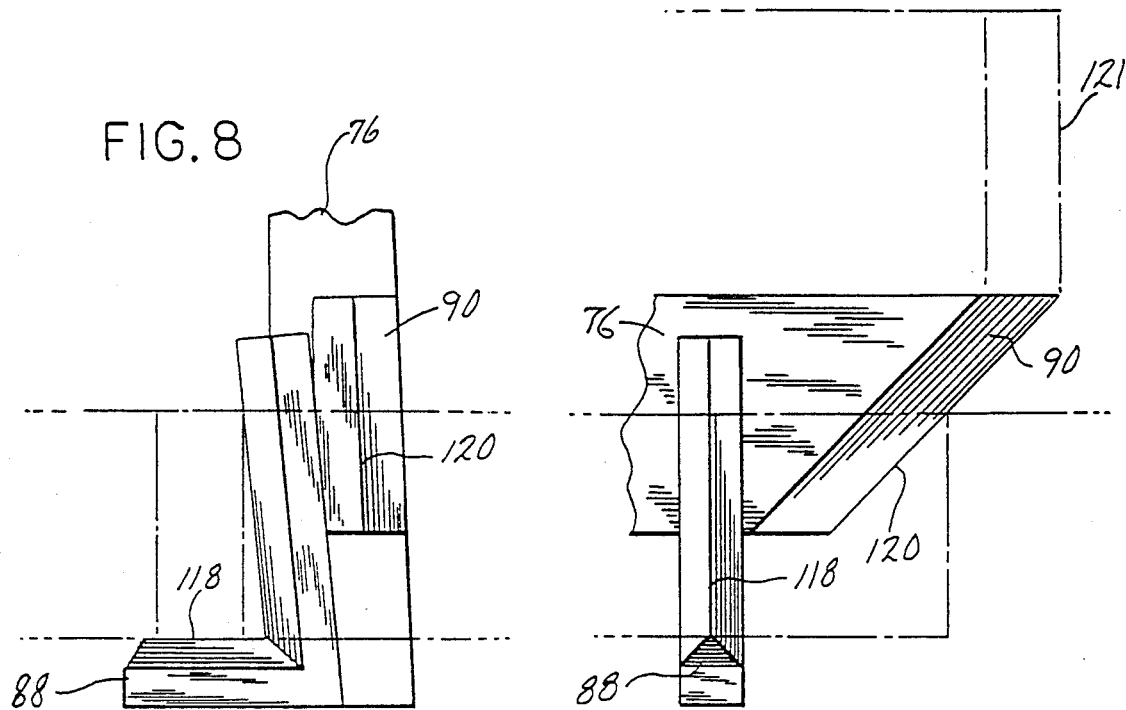
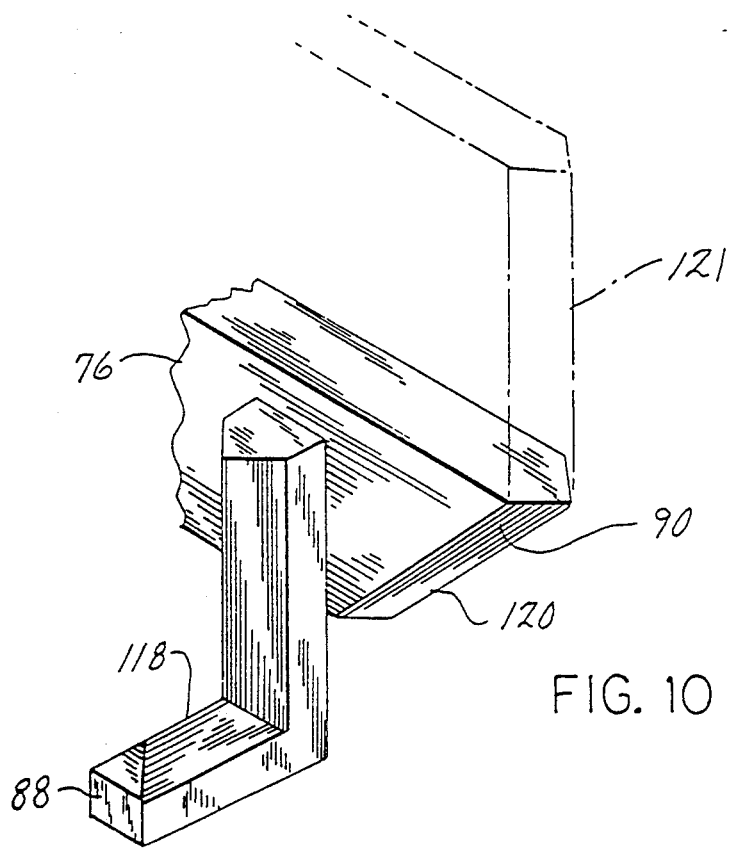

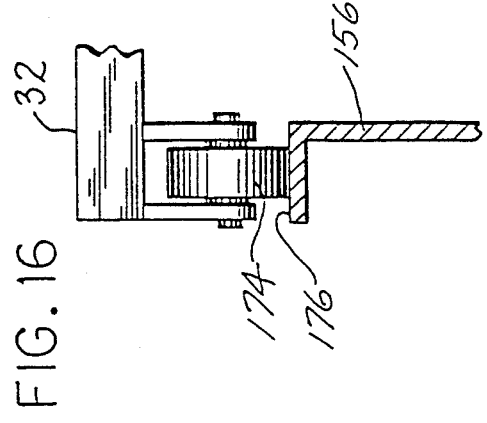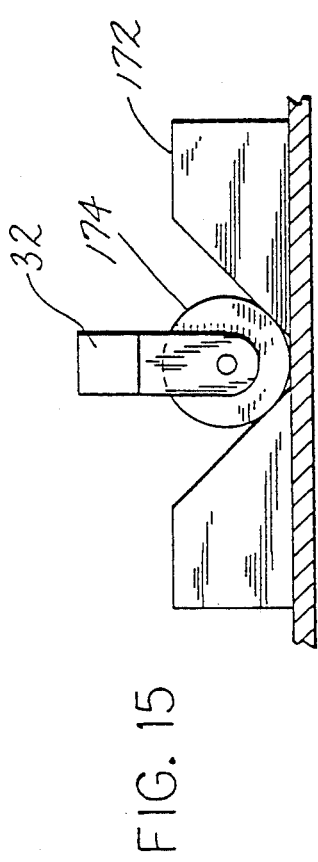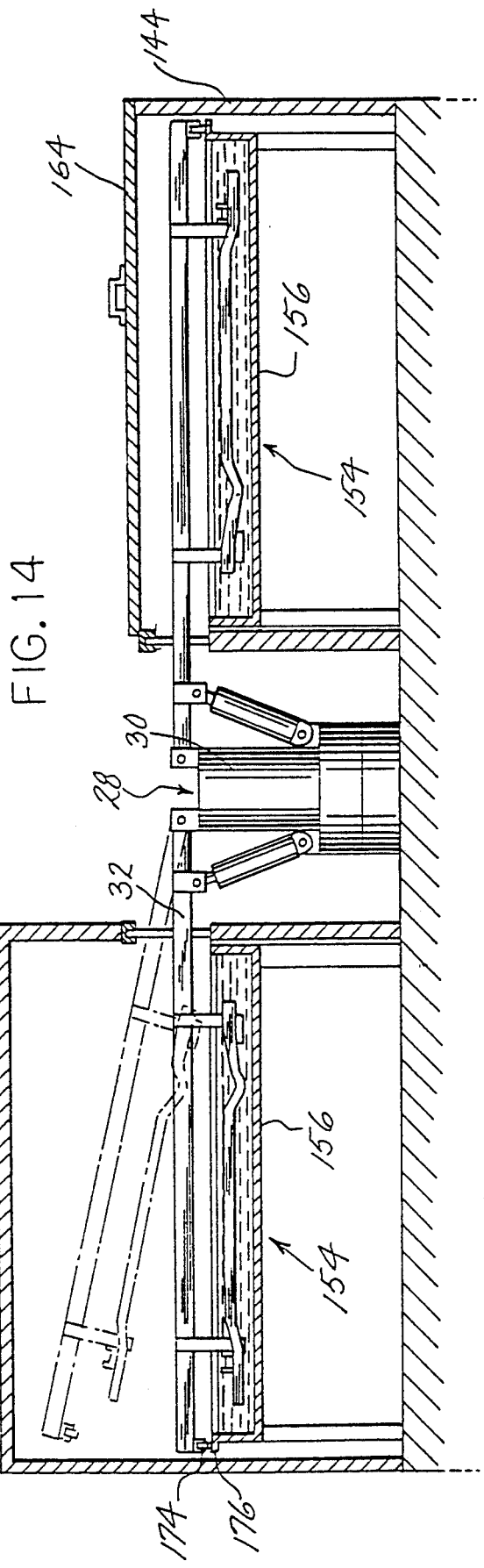

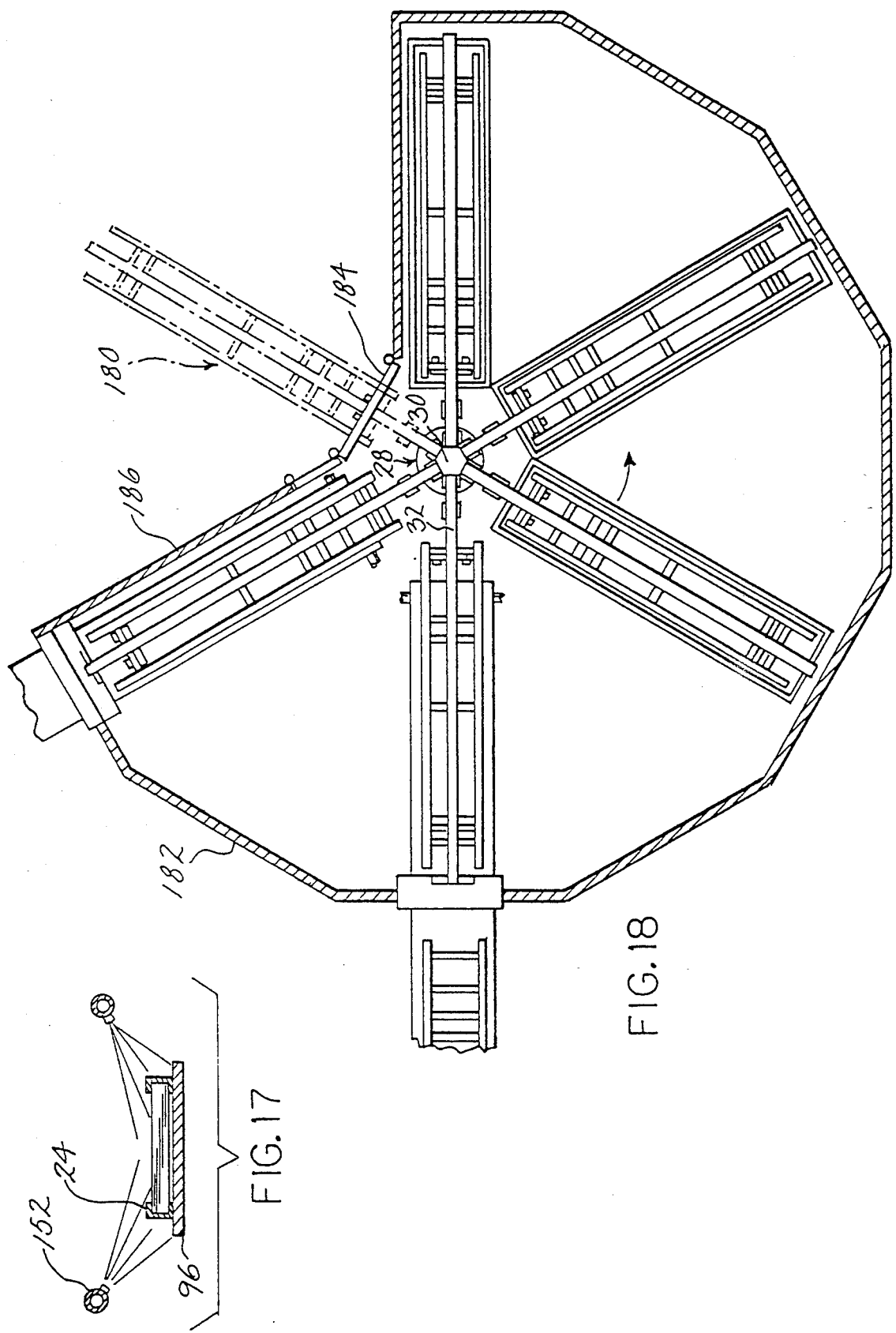

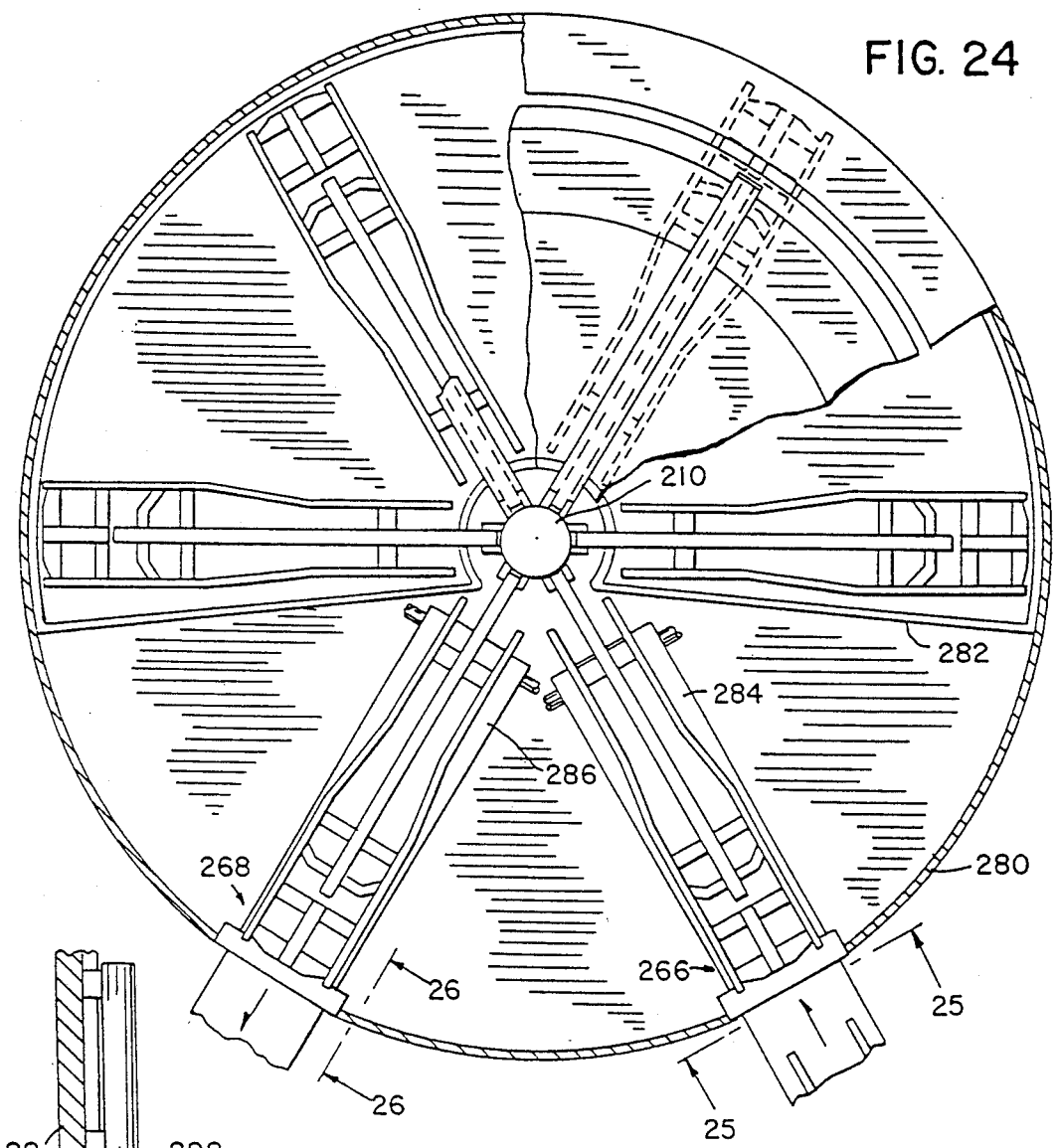
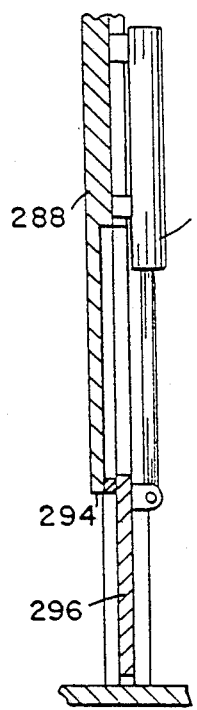
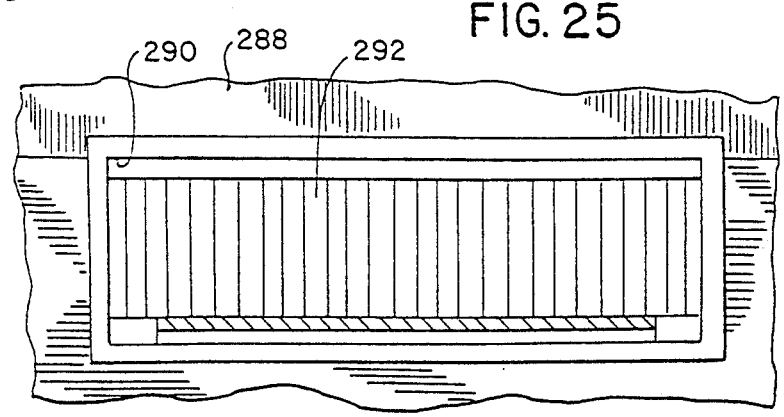
FIG. 24
FIG. 26
FIG. 25

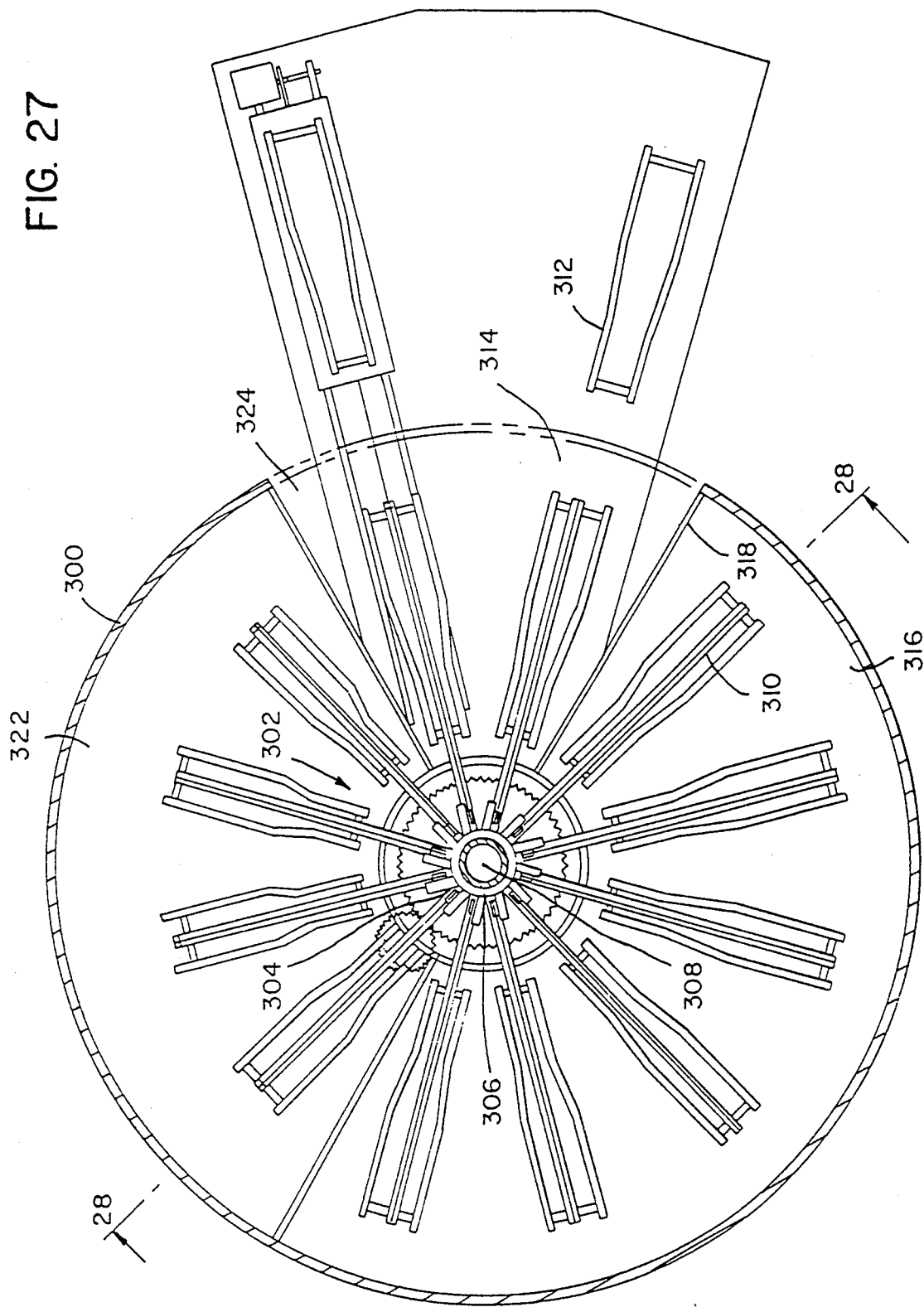

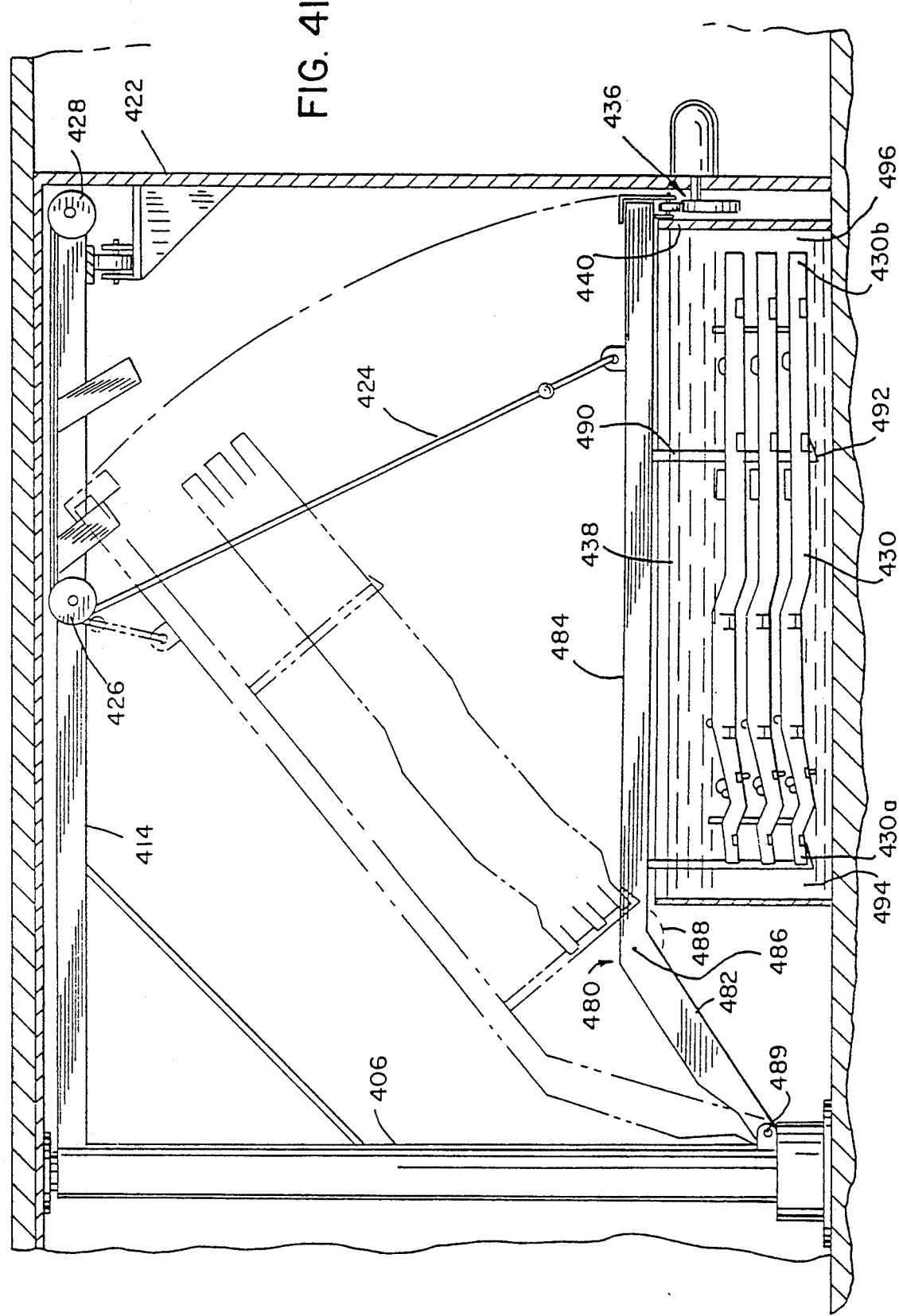

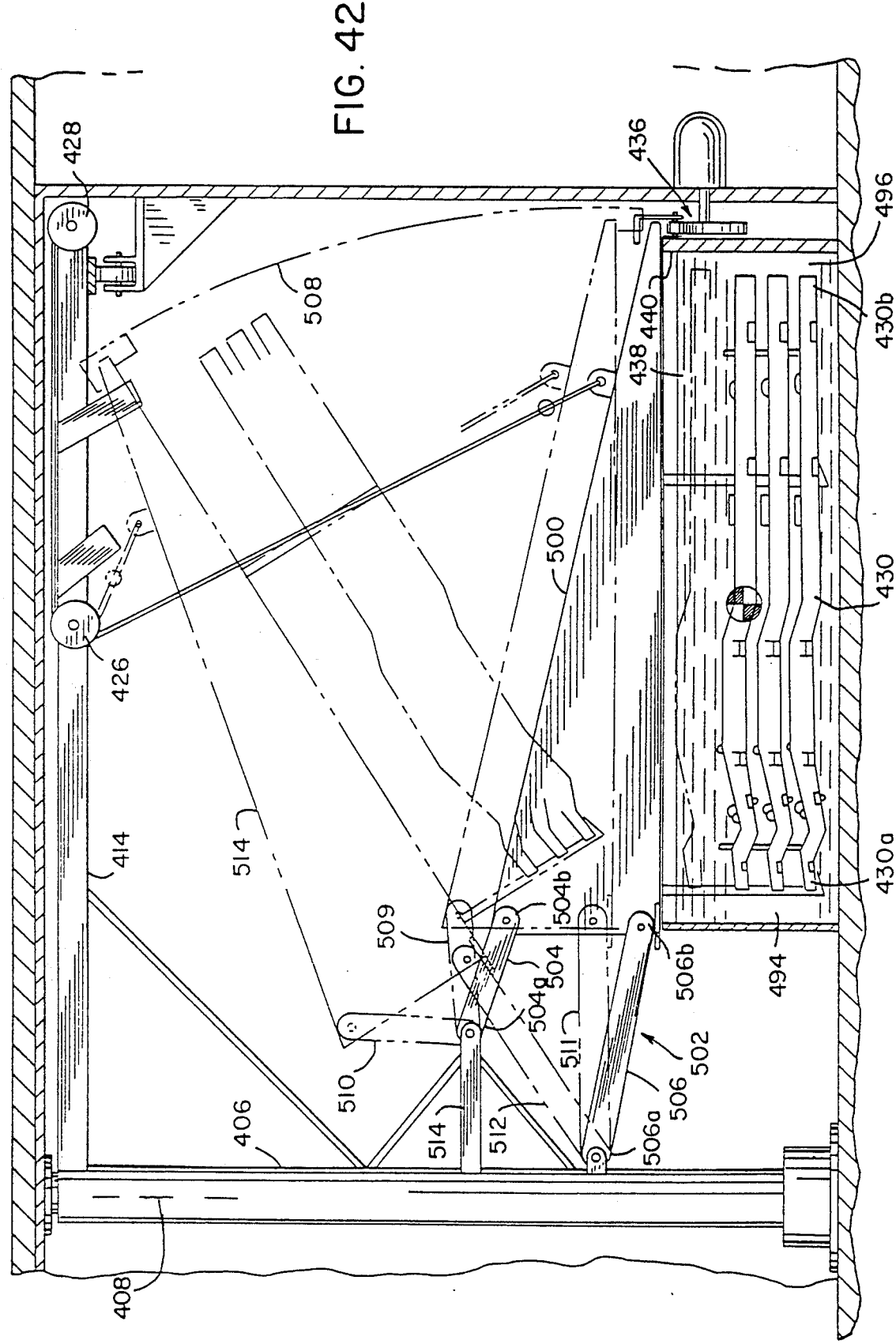

COATING METHOD AND FACILITY FOR VEHICLE STRUCTURAL COMPONENTS

CROSS REFERENCE TO RELATED APPLICATIONS

This application is a division of application Ser. No. 07/776,683 now U.S. Pat. No. 5,152,840, filed Oct. 11, 1991, which is a continuation of application Ser. No. 07/582,481 now abandoned, filed Sep. 14, 1990, which is a continuation-in-part of application Ser. No. 07/469,253 now U.S. Pat. No. 5,061,528, filed Jan. 24, 1990, which is a continuation-in-part of application Ser. No. 07/389,346 now U.S. Pat. No. 5,061,529, filed Aug. 3, 1989.

BACKGROUND AND SUMMARY

The present invention relates to continuing development efforts directed toward manufacturing methods and facilities for applying a coating to vehicle structural components, including the application of a hot melt wax coating to vehicle frames for protection against rust and corrosion.

Parent Applications

The invention of the above noted '346 parent application arose during development efforts directed toward reducing the high capital expense of a manufacturing facility for coating vehicle structural components such as frames. Vehicle manufacturers are more commonly requiring vendors and parts suppliers to have local onsite manufacturing or processing facilities coordinating with the assembly operation of the vehicle manufacturer. In the case of suppliers providing vehicle structural components such as frames, this requires erection of a coating facility at each of the various satellite assembly facilities. However, erection of multiple satellite coating facilities is not cost effective due to the extremely high capital expense of same.

A vehicle frame is a generally flat longitudinal structural member which in one exemplary size has a longitudinal length of about 178 inches, a lateral width of about 42 inches, and a height of about 16 inches, though the dimensions may of course vary. Prior facilities for applying a hot melt wax coating to such frames typically require buildings of about 2 million cubic feet, with 50,000 square feet of lateral area and over 60 feet in height. The frames are hung vertically and transported to a dipping tank and dipped downwardly into the tank for coating the frame in the hot melt wax liquid, and then raised out of the tank. Hence, the building must be at least twice as high as the longitudinal length of the frame The tank volume is about 63,000 gallons. The building is heated by ovens or the like such that the heated air in the building preheats the frames prior to dipping, to enhance the coating during the dip into the hot melt wax liquid tank. Preheating of the frames with air is inefficient and requires long preheat times. The vertical hanging of the frames also requires large openings into and out of the building, causing significant heat loss and energy inefficiency. The construction cost of the building is high because of its special requirements. Furthermore, the building has no other use.

The invention of the '346 parent application addresses and solves the above noted problems with a simple and effective manufacturing method and facility. The invention of the '346 parent application reduces the building volume by a factor of 10 or more, e.g. the new =building can be reduced to as little as 5% of the volume of the prior building. The invention of the '346 parent application also reduces the tank volume requirements for the coating liquid to as little as 4%, e.g. to as low as 2,000 gallons instead of the 63,000 gallons required for the above noted prior tank. This saves wax cost. The invention of the '346 parent application also significantly reduces the height requirement of the tank, e.g. from about 25 feet deep to about 25 inches deep. This desirably solves problems of hydrostatic fluid pressure and leakage caused thereby at the bottom of the tank. The construction cost of the building is reduced by a factor of about 10 due to the reduced special requirements of the building and also due to reduced loading capability of the building due to special transport structure within the building in accordance with the invention of the '346 parent application for carrying the vehicle structural components. The building is adaptable to other uses in the event of changing requirements. The transport mechanism and core within the building can be moved to other buildings and locations.

The invention of the above noted '253 application provides a manufacturing method and facility with substantially reduced space requirements. The invention of the '253 application enables substantial portions of the processing mechanism to be placed external to the heated housing containing the coating tank. The invention of the '253 application is also suitable to low volume, small quantity applications, if desired. In one embodiment, a tank housing has a specially configured slot opening allowing passage therethrough of a cable of a winch pulley which rolls along a support beam of a jib crane as an arm pivots to lower and raise the frame into and out of a horizontal tank. The tank is 24 feet long by 6 feet wide by 32 inches deep to provide a volume of 384 cubic feet and holds 2,872 gallons, and has a surface area of 144 square feet. The volume of the shell housing over the tank is 2,262 cubic feet. In another embodiment, the tank extends partially circumferentially around a central rotational hub and has an area of 536 square feet and a volume of 984 cubic feet and holds 7,358 gallons. The volume of the shell housing over the tank is 5,074 cubic feet.

Present Invention

The present invention arose during continuing development efforts relating to the above noted manufacturing methods and facilities.

In one aspect, the invention provides unloading and stacking of vehicle structural components below the unloading station.

In another aspect, the invention provides stroking and oscillation of vehicle structural components in the dip tank, to accelerate heat transfer, and to improve coating by eliminating air pockets.

In another aspect, the invention provides a pivoted bent dip arm on a rotary carousel affording improved dipping and uniform coating action.

In another aspect, the invention provides parallelogram linkage affording improved dipping and uniform coating action.

In another aspect, the invention provides processing sequences and bidirectional travel paths reducing space requirements.

The invention also continues improvements in lower operating and maintenance costs. The invention enables significant reductions in manpower requirements. The invention enables the vehicle structural components to be automatically loaded, processed, unloaded, and stacked. The invention enables maintenance items to be located externally and at ground level, which significantly reduces servicing costs.

BRIEF DESCRIPTION OF THE DRAWINGS

Parent Applications

FIG. 5 is a sectional view taken along line 5—5 of FIG. 4.

FIG. 6 is an enlarged view of a portion of the structure in FIG. 4.

FIG. 7 is a perspective view of the structure of FIG. 6.

FIG. 8 is an enlarged view of a portion of the structure in FIG. 4.

FIG. 9 is an end view of the structure in FIG. 8.

FIG. 10 is a perspective view of the structure in FIG. 8.

FIG. 11 is a sectional view taken along line 11—11 OF FIG. 4.

FIG. 12 is a sectional view taken along line 12—12 of FIG. 1.

FIG. 14 is a sectional view taken along line 14—14 of FIG. 13.

FIG. 15 is a sectional view taken along line 15—5 of FIG. 13.

FIG. 16 is a sectional view taken along line 16—16 of FIG. 13.

FIG. 17 is a sectional view taken along line 17—17 of FIG. 13.

FIG. 18 is a top view of another embodiment of a manufacturing facility constructed in accordance with the '346 parent application.

FIG. 24 is a top view of another embodiment of a manufacturing facility constructed in accordance with the '253 parent application.

FIG. 25 is a view taken along line 25—25 of FIG. 24.

FIG. 26 is a view taken along line 26—26 of FIG. 24.

Present Invention

FIG. 27 is a top view of a manufacturing facility constructed in accordance with the present invention.

Figure 28:
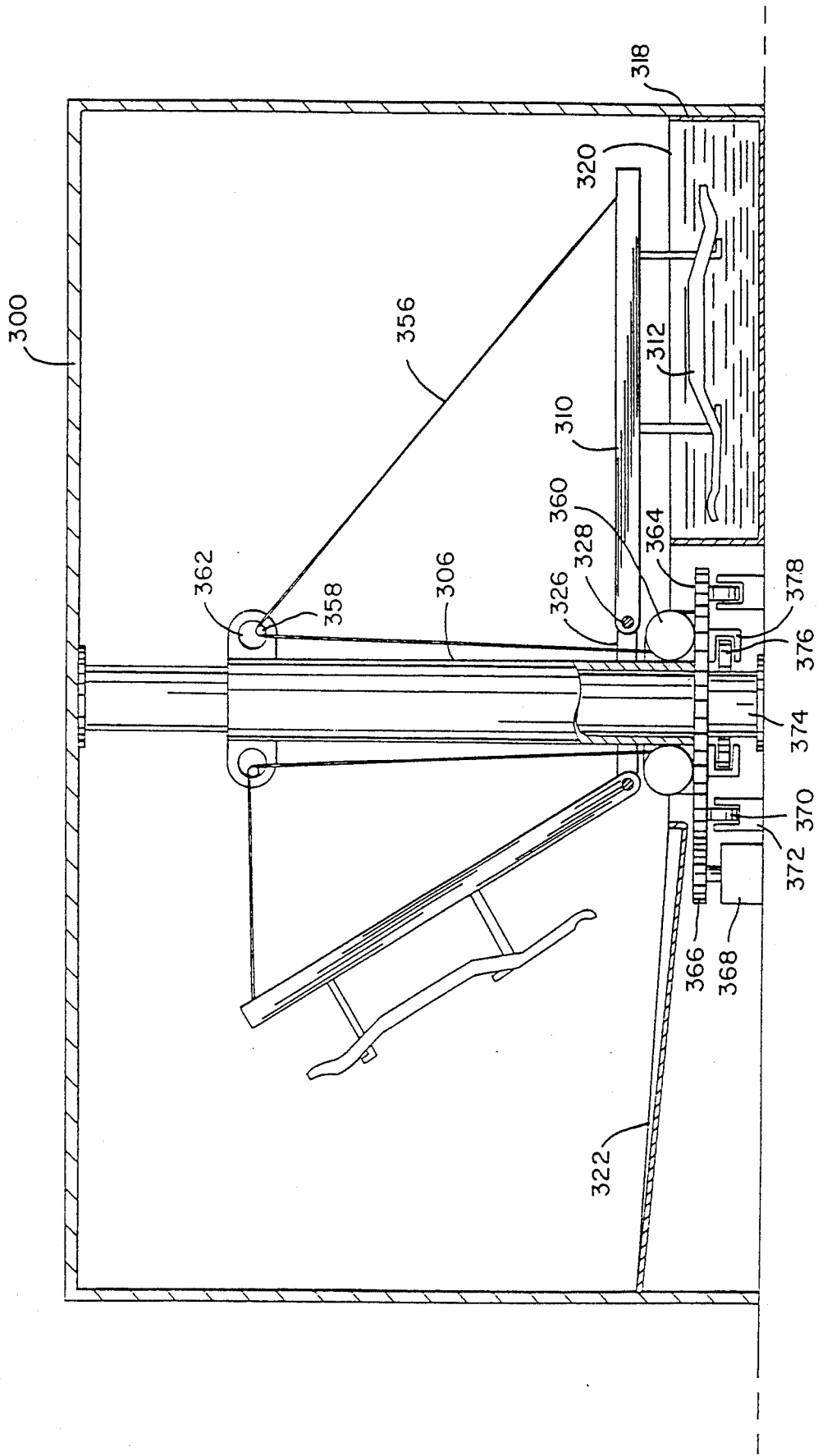

FIG. 28 is a sectional view taken along line 28—28 of FIG. 27.

Figure 29:
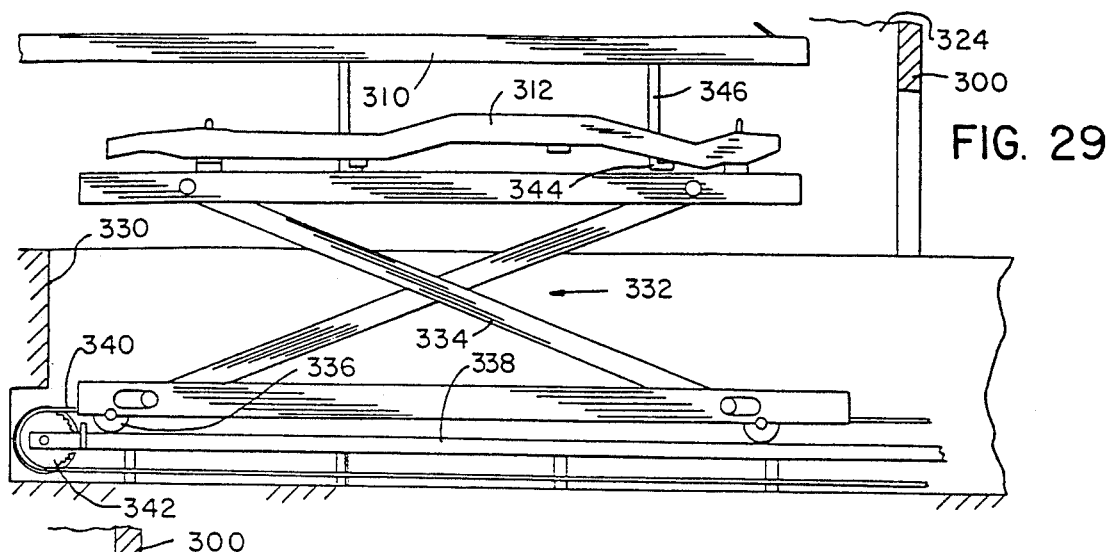

FIG. 29 is a side view of a portion of the structure of FIG. 27.

Figure 30:
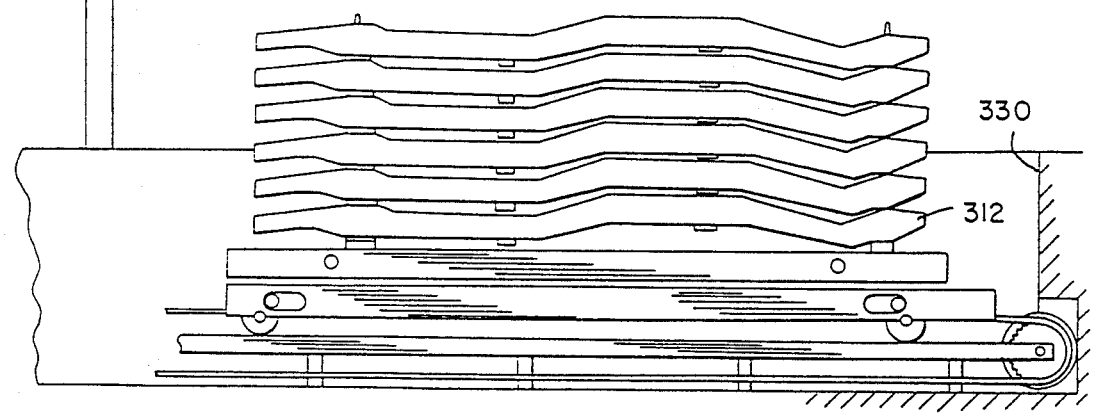

FIG. 30 is a side view of another portion of the structure of FIG. 27.

Figure 31:
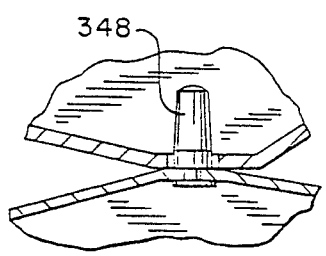

FIG. 31 is an enlarged view of a portion of the structure of FIG. 30.

Figure 32:
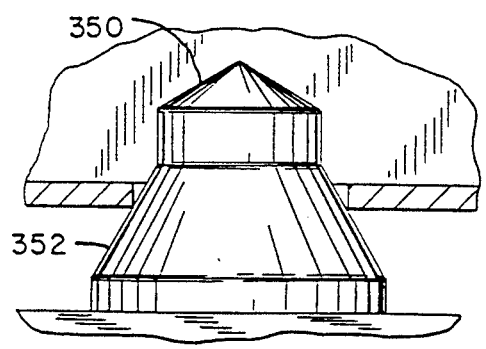

FIG. 32 is like FIG. 31 and shows another embodiment.

Figure 33:
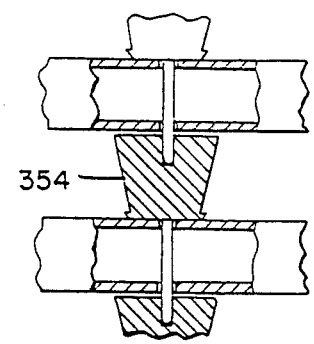

FIG. 33 is like FIG. 31 and shows another embodiment.

Figure 34:
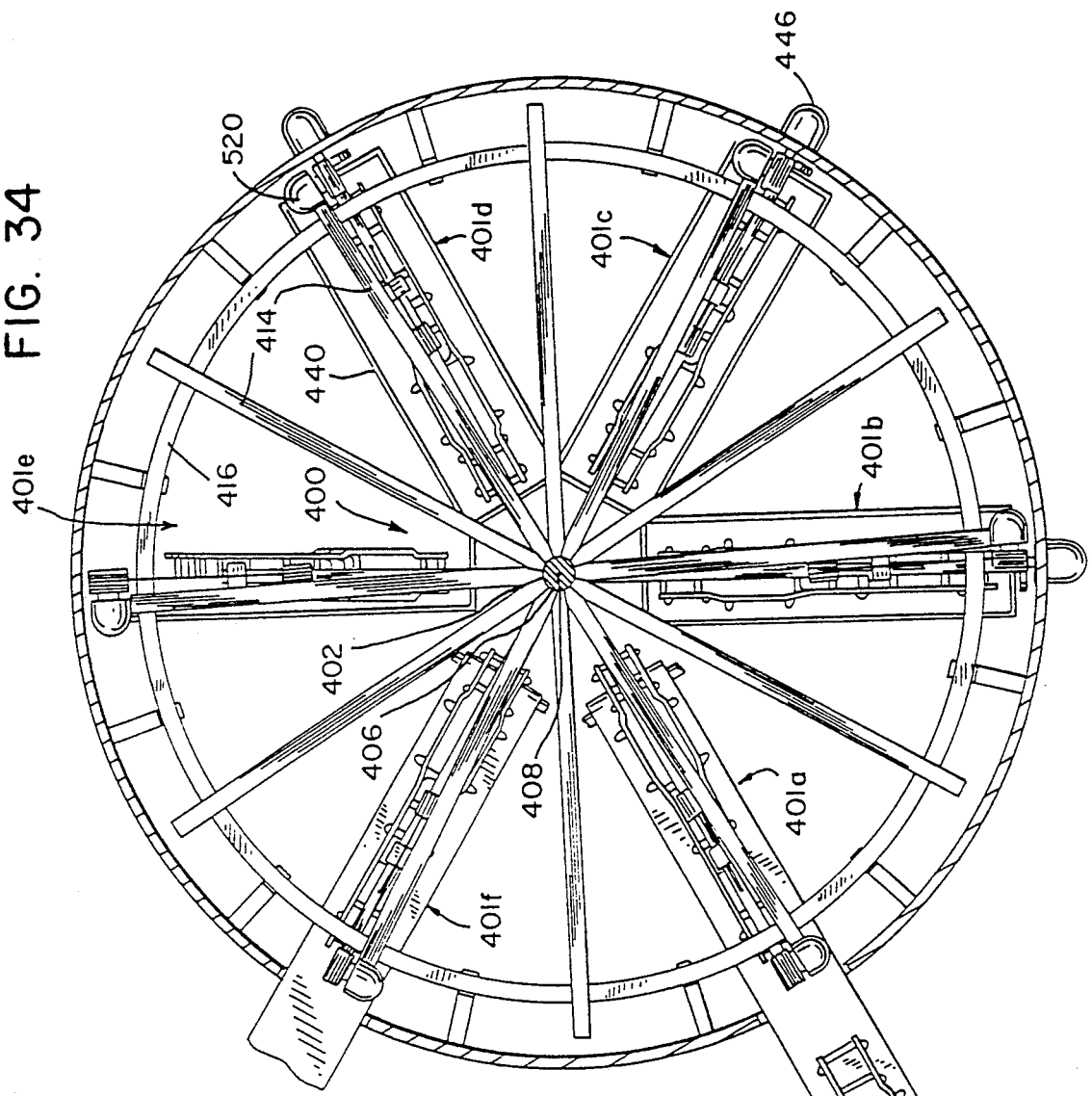

FIG. 34 is a top view of another embodiment of a manufacturing facility constructed in accordance with the invention.

Figure 35:
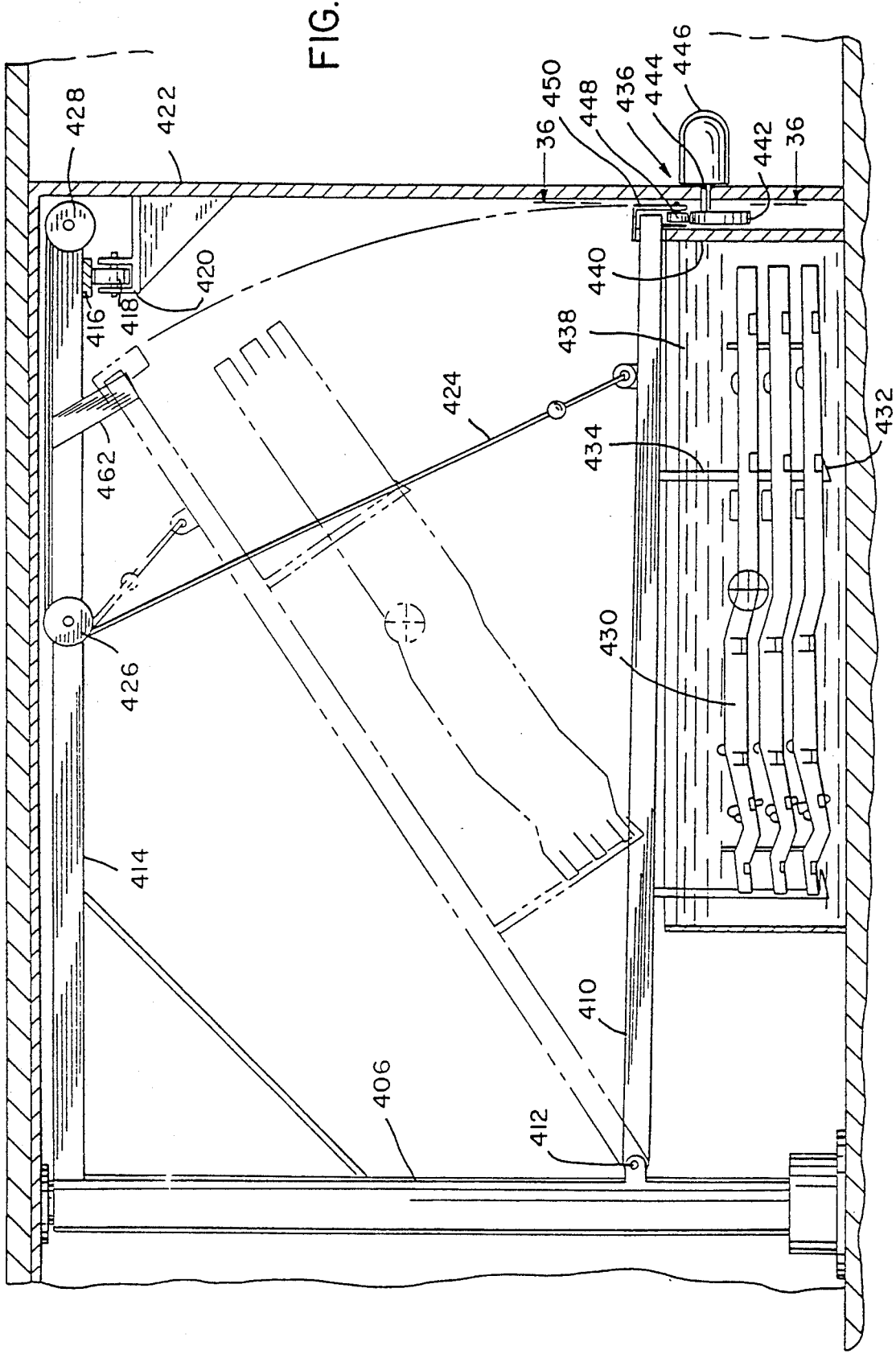

FIG. 35 is a side view of a portion of the structure of FIG. 34.

Figure 36:
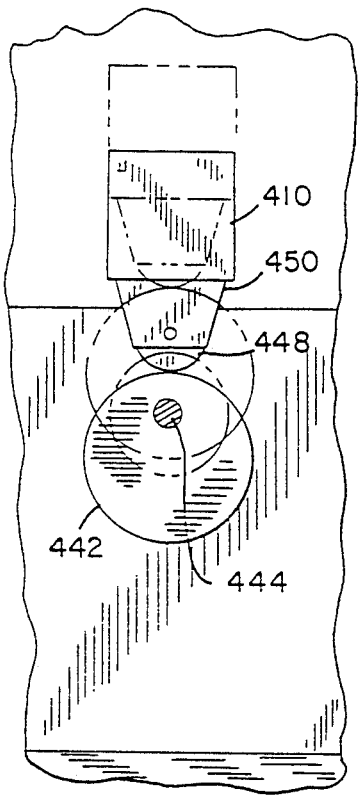

FIG. 36 is an end view of a portion of the structure of FIG. 35.

Figure 37:
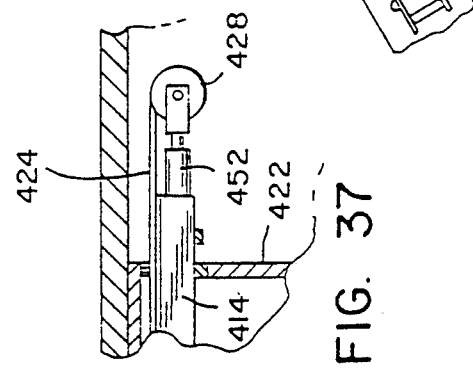

FIG. 37 shows an alternate embodiment of a portion of the structure of FIG. 35.

Figure 38:
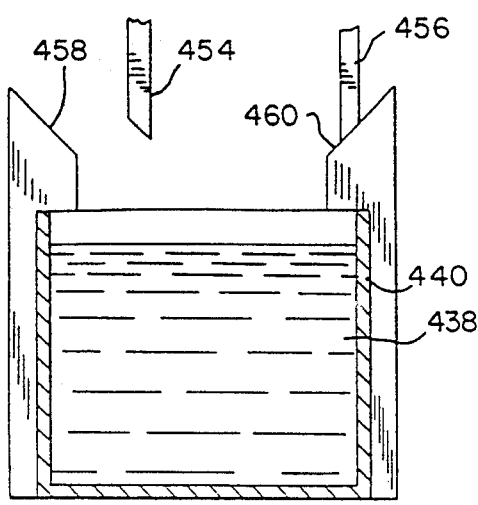

FIG. 38 shows another alternate embodiment of a portion of the structure of FIG. 35.

Figure 39:
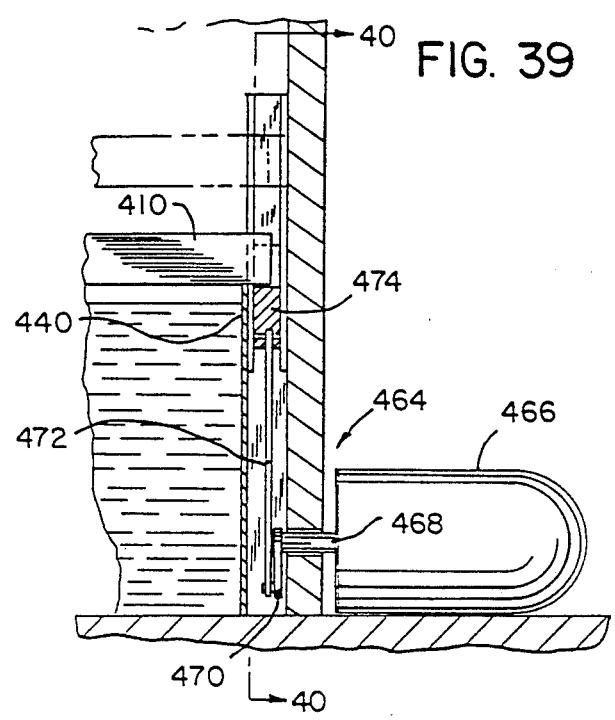

FIG. 39 shows another alternate embodiment of a portion of the structure of FIG. 35.

Figure 40:
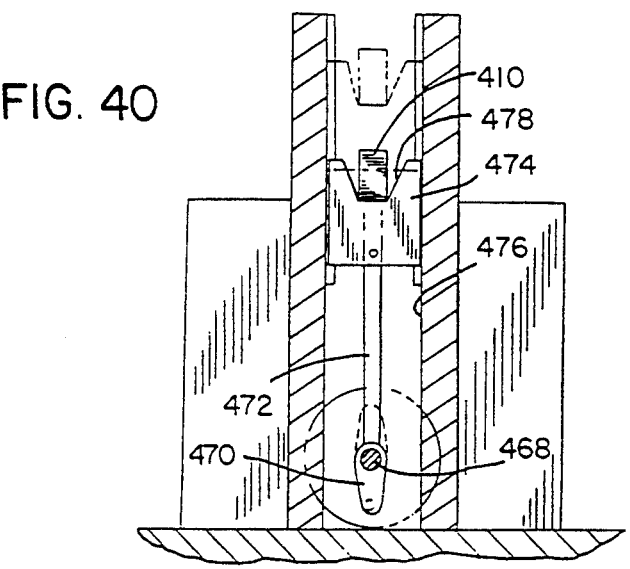

FIG. 40 is a sectional view taken along line 40—40 of FIG. 39.

FIG. 41 is like FIG. 35 and shows another embodiment.

FIG. 42 is like FIG. 35 and shows another embodiment.

Figure 43:
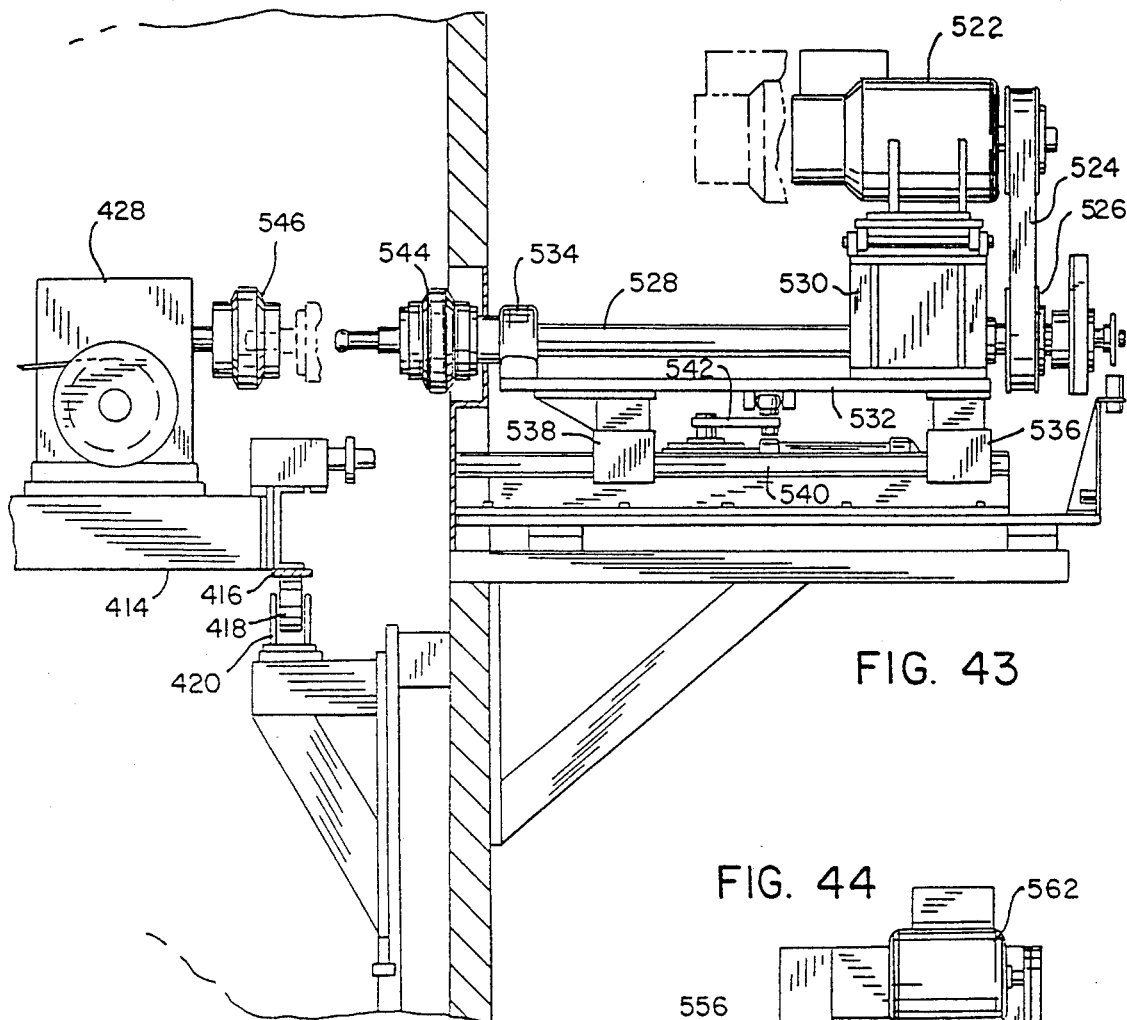

FIG. 43 shows another alternate embodiment of a portion of the structure of FIG. 35.

Figure 44:
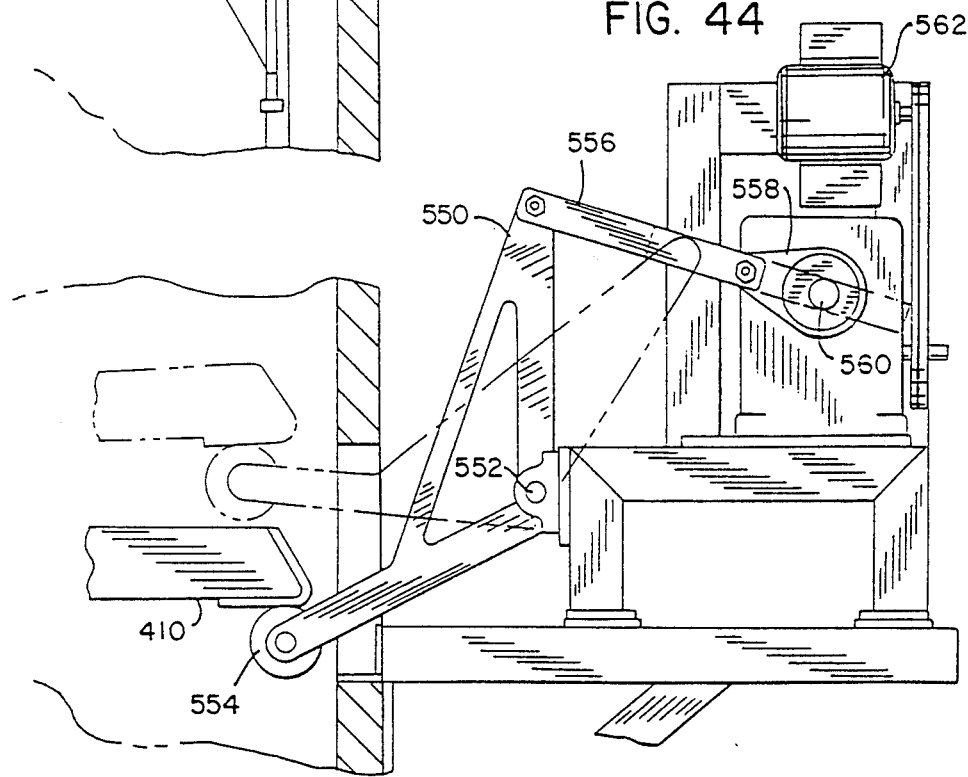

FIG. 44 shows another alternate embodiment of a portion of the structure of FIG. 35.

Figure 45:
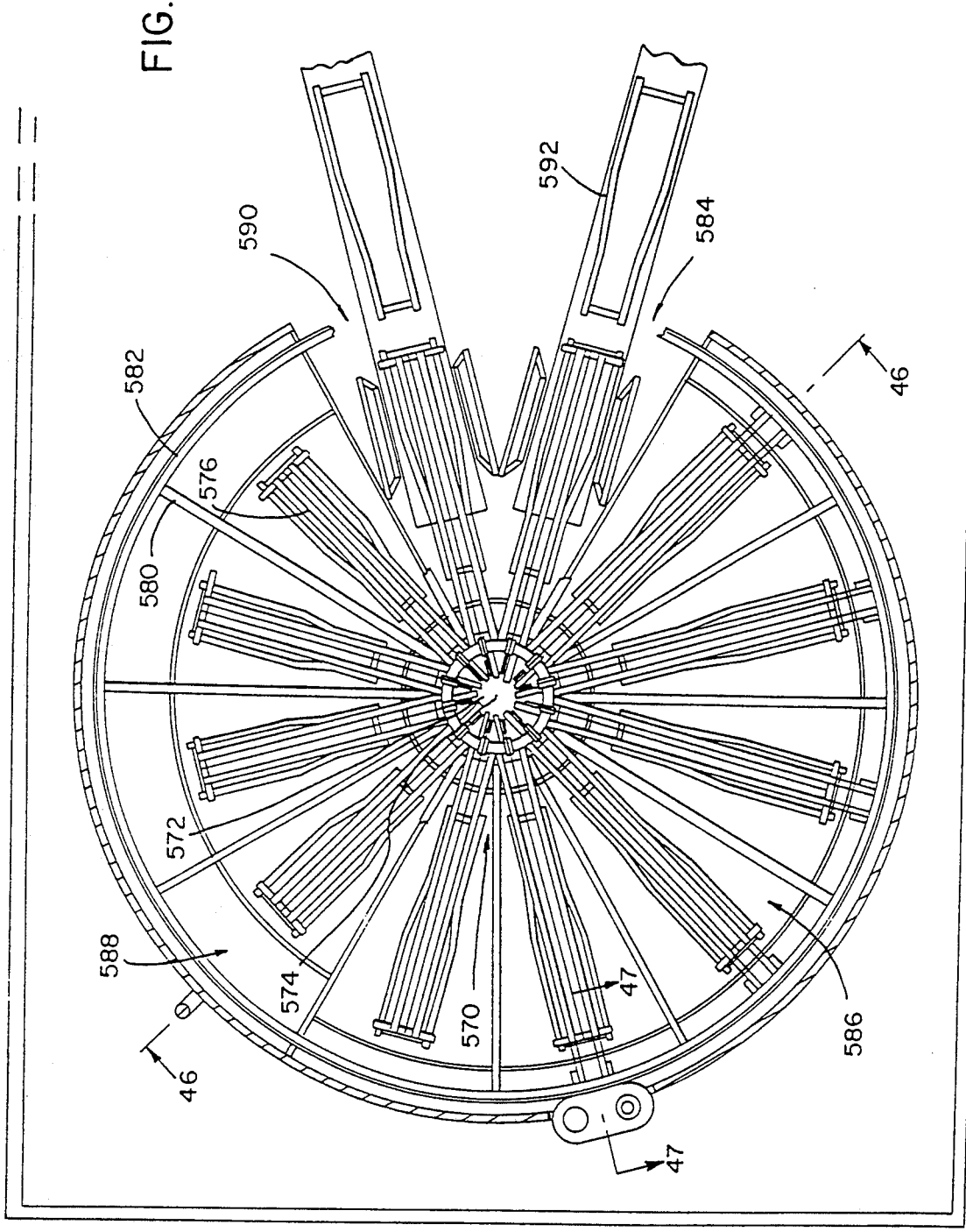

FIG. 45 is a top view of another embodiment of a manufacturing facility constructed in accordance with the invention.

Figure 46:
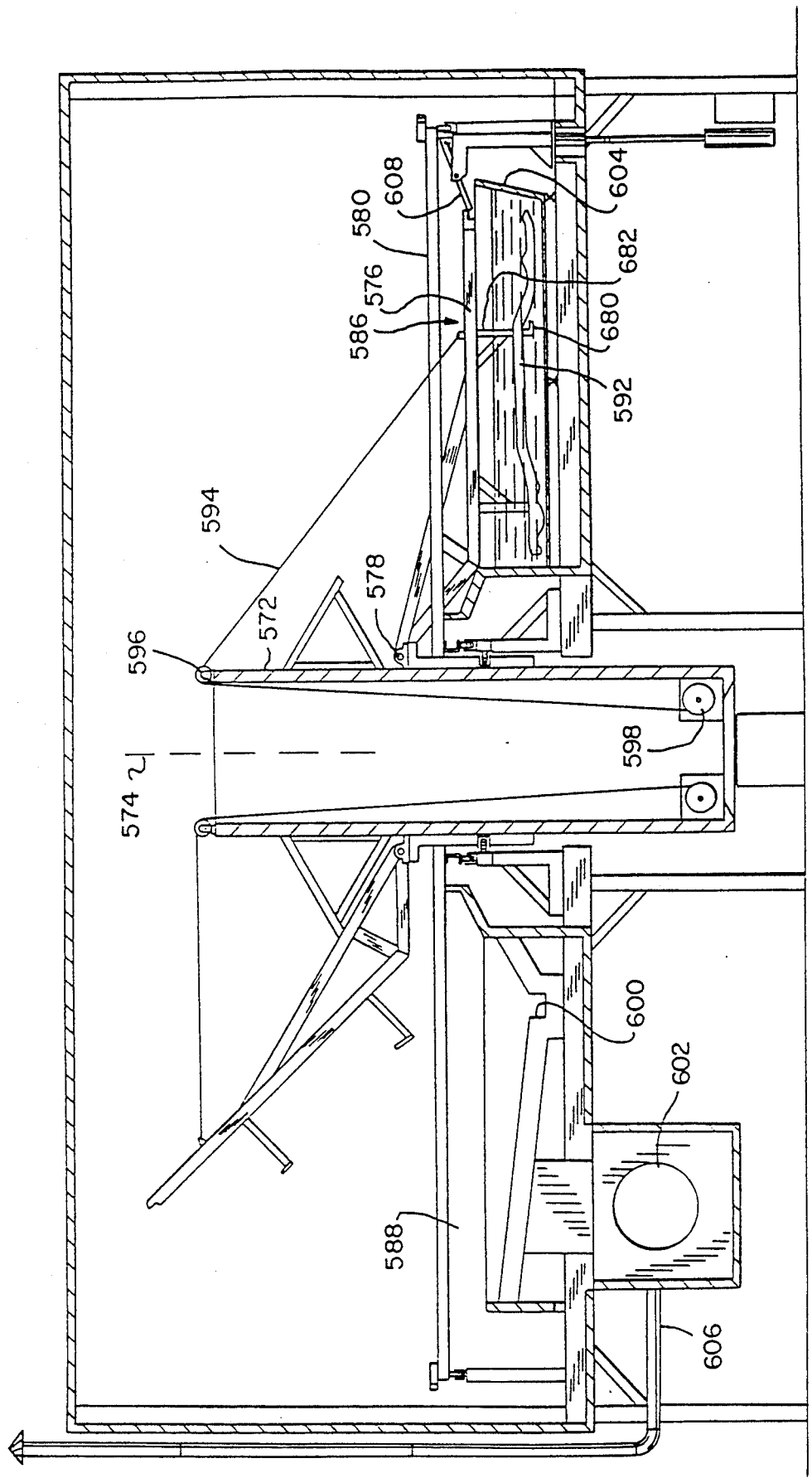

FIG. 46 is a sectional view taken along line 46—46 of FIG. 45.

Figure 47:
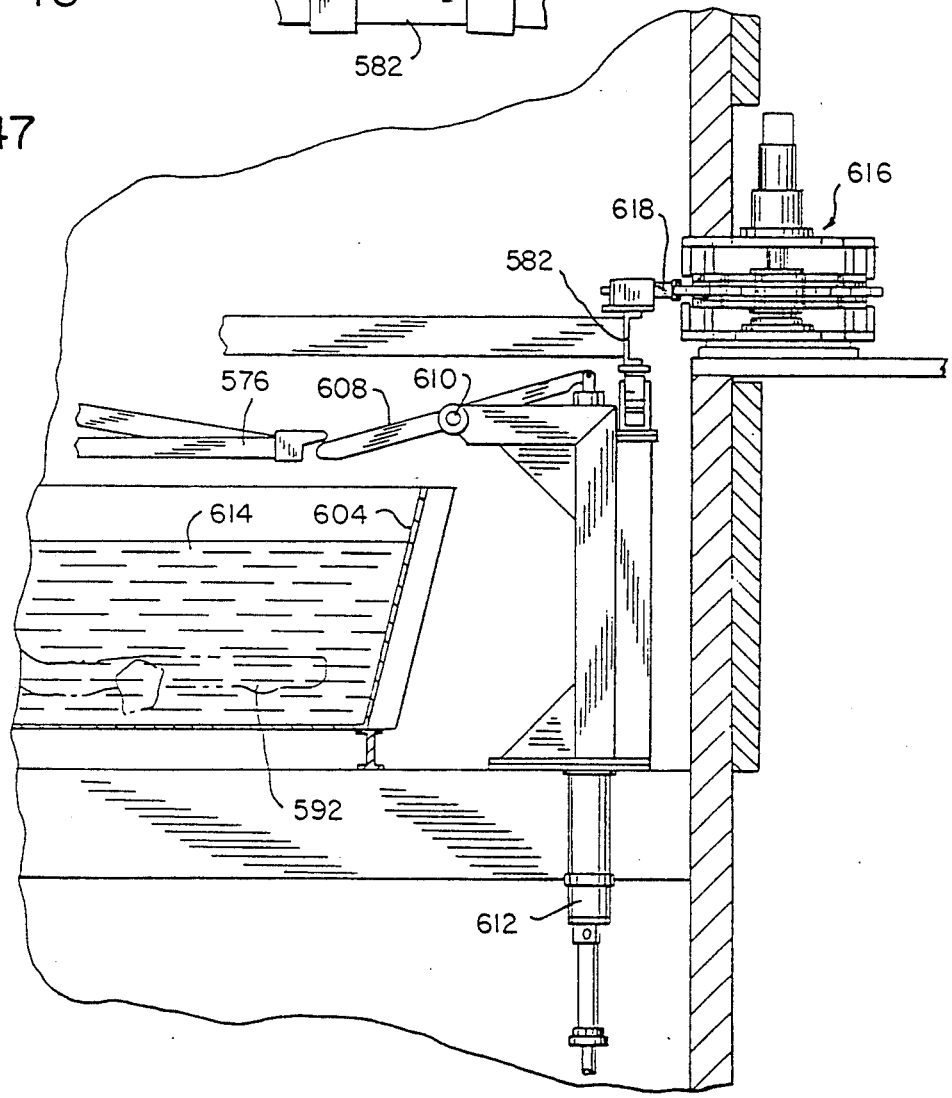

FIG. 47 is a sectional view taken along line 47—47 of FIG. 45.

Figure 48:
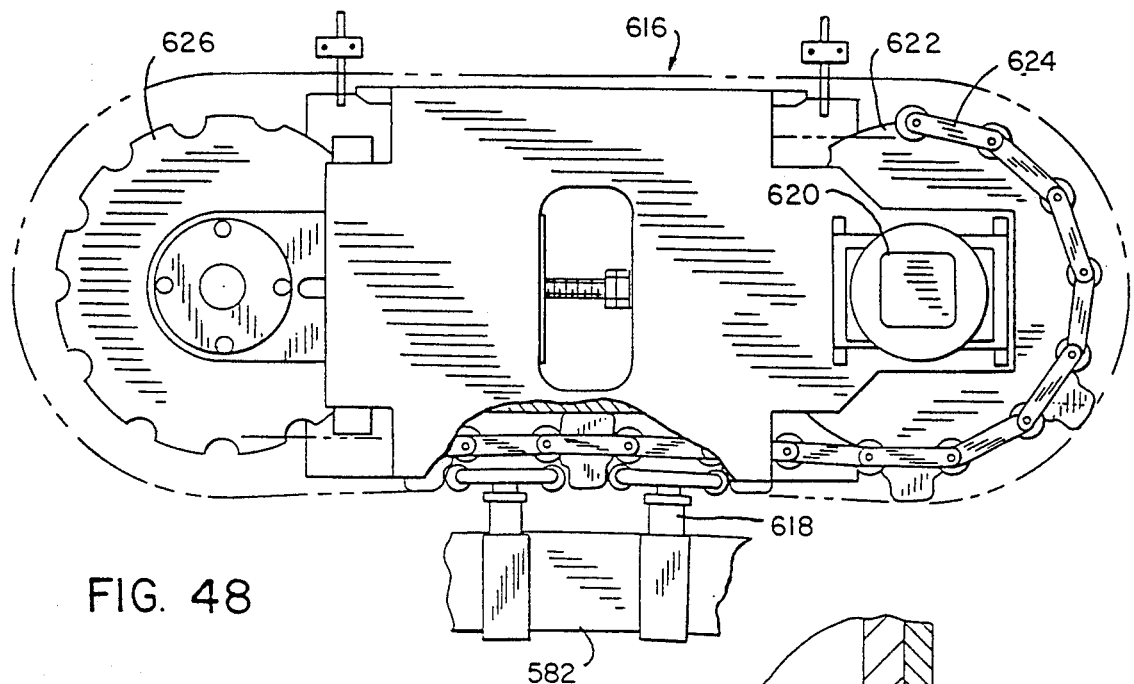

FIG. 48 is a top view of a portion of the structure of FIG. 47.

Figure 49:
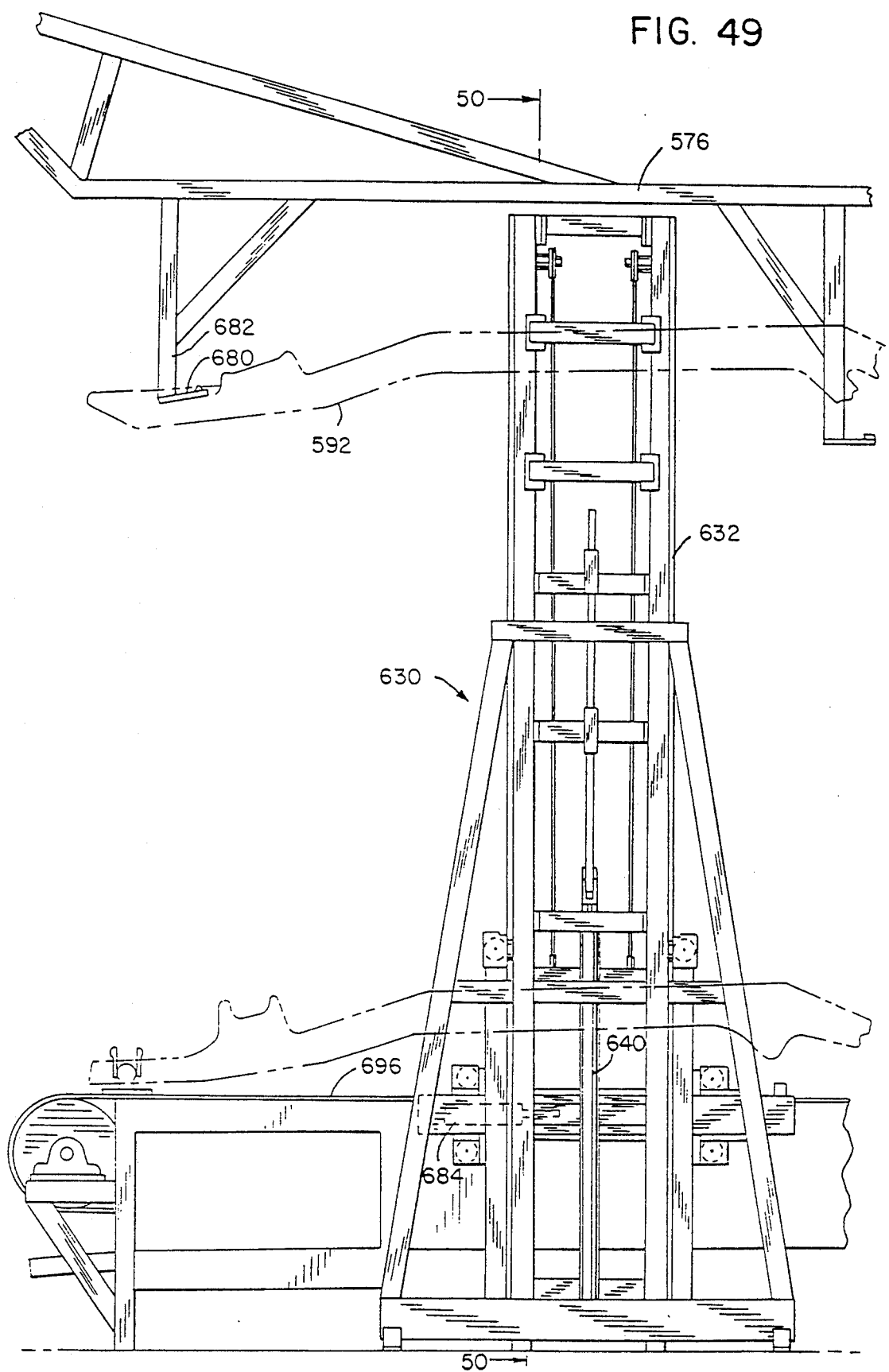

FIG. 49 is a side view of a portion of the structure of FIG. 45.

Figure 50:
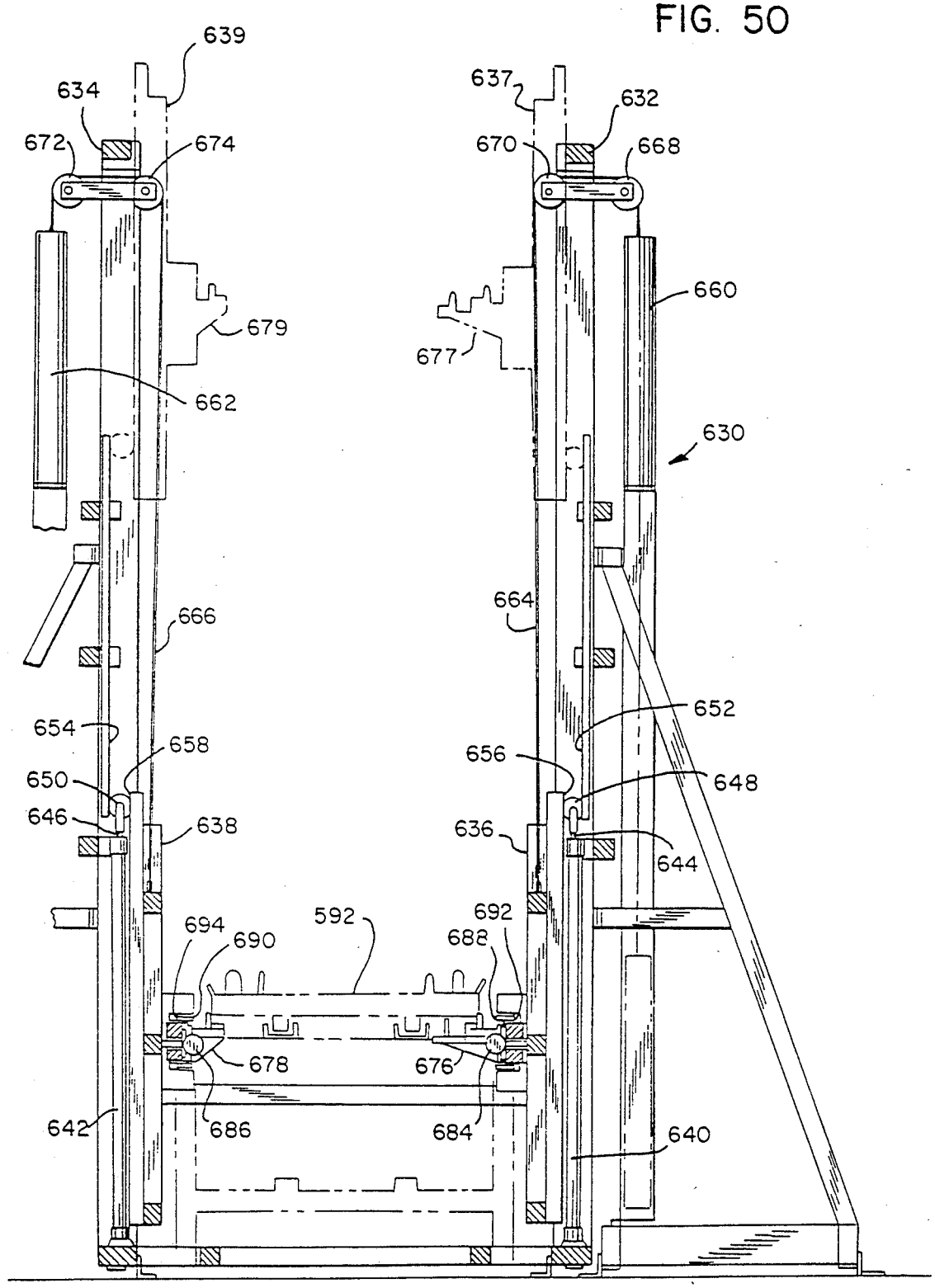

FIG. 50 is a sectional view taken along line 50—50 of FIG. 49.

Figure 51:
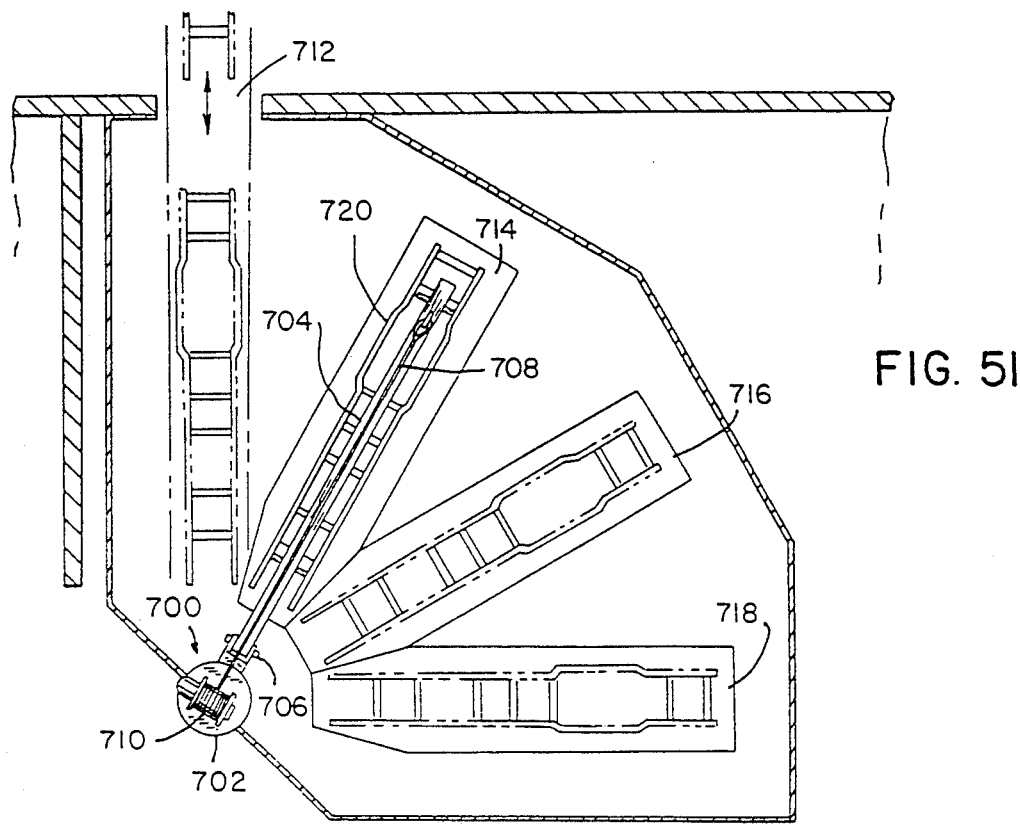

FIG. 51 is a top view of another embodiment of a manufacturing facility constructed in accordance with the invention.

Figure 52:
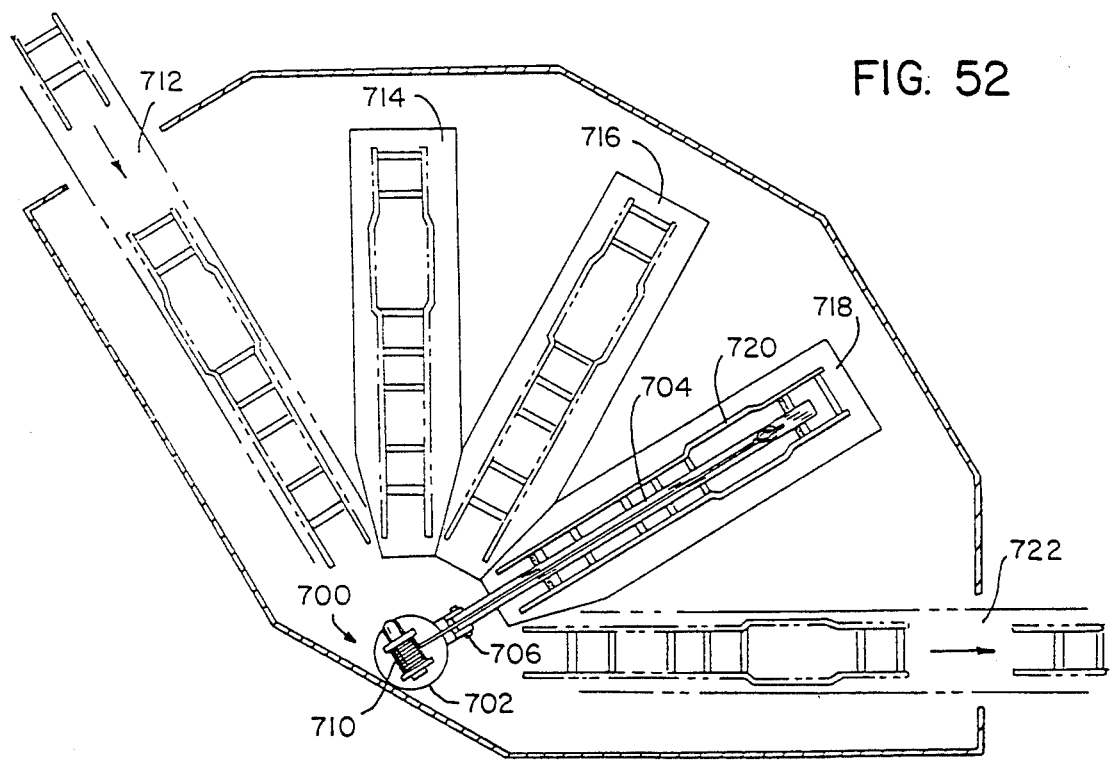

FIG. 52 is a top view of another embodiment of a manufacturing facility constructed in accordance with the invention.

DETAILED DESCRIPTION

Parent Applications

Figure 1:
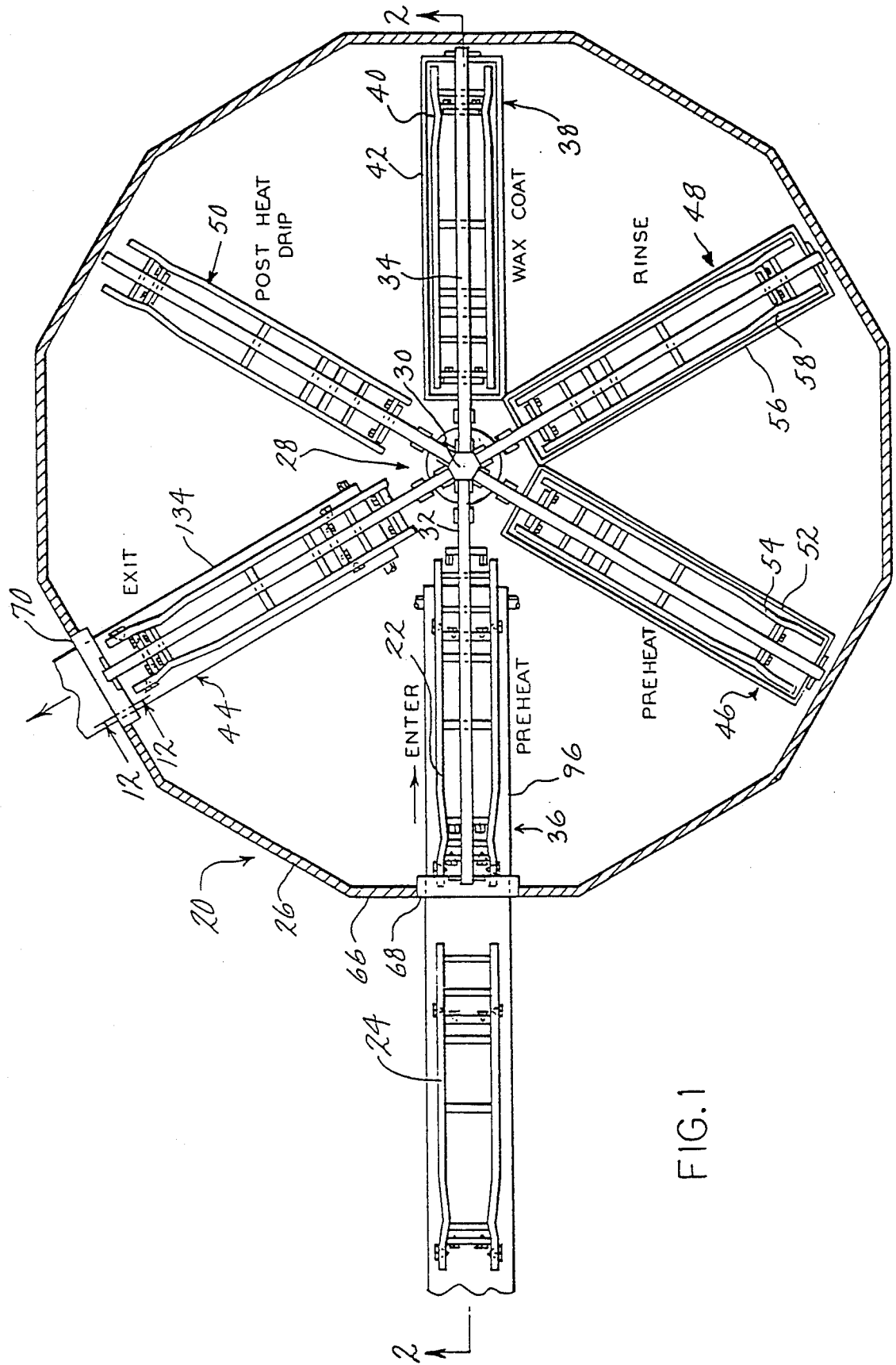
FIG. 1 is a top view of a manufacturing facility constructed in accordance with the invention of the above noted '346 parent application.

FIG. 1 shows a manufacturing facility 20 with substantially reduced space requirements for applying a coating to vehicle structural components such as frames 22, 24, and the like. The facility includes a building 26 housing a central rotary carousel 28 having a central hub 30 rotatable about a vertical axis and having a plurality of arms 32, 34, etc. thereon. Building 26 also houses a loading station 36, a coating station 38 having coating liquid 40 in tank 42, and an unloading station 44, all spaced peripherally around hub 30 such that rotation of hub 30 moves the arms to the various stations. Building 26 also houses a preheat wash station 46, a rinse station 48, and a post heat drip station 50. Preheat wash station 46 includes a tank 52 with a wash liquid 54 at an elevated temperature. Rinse station 48 includes a tank 56 with a rinse liquid 58 at an elevated temperature. The preheat wash and rinse stations preheat the frame by liquid heat transfer, to enhance the hot melt wax coating at station 38 when the frame is dipped into the hot melt wax coating liquid 40, to be described.

Counterclockwise rotation of hub 30 moves arm 32 to loading station 36 as shown in FIG. 1, for attaching frame 22 to arm 32, to be described. Further counterclockwise rotation of hub 30 moves arm 32 to preheat wash station 46, and then to rinse station 48, and then to coating station 38, and then to post heat drip station 50, and then to unloading station 44 for detaching frame 22 from the arm.

Figure 2:
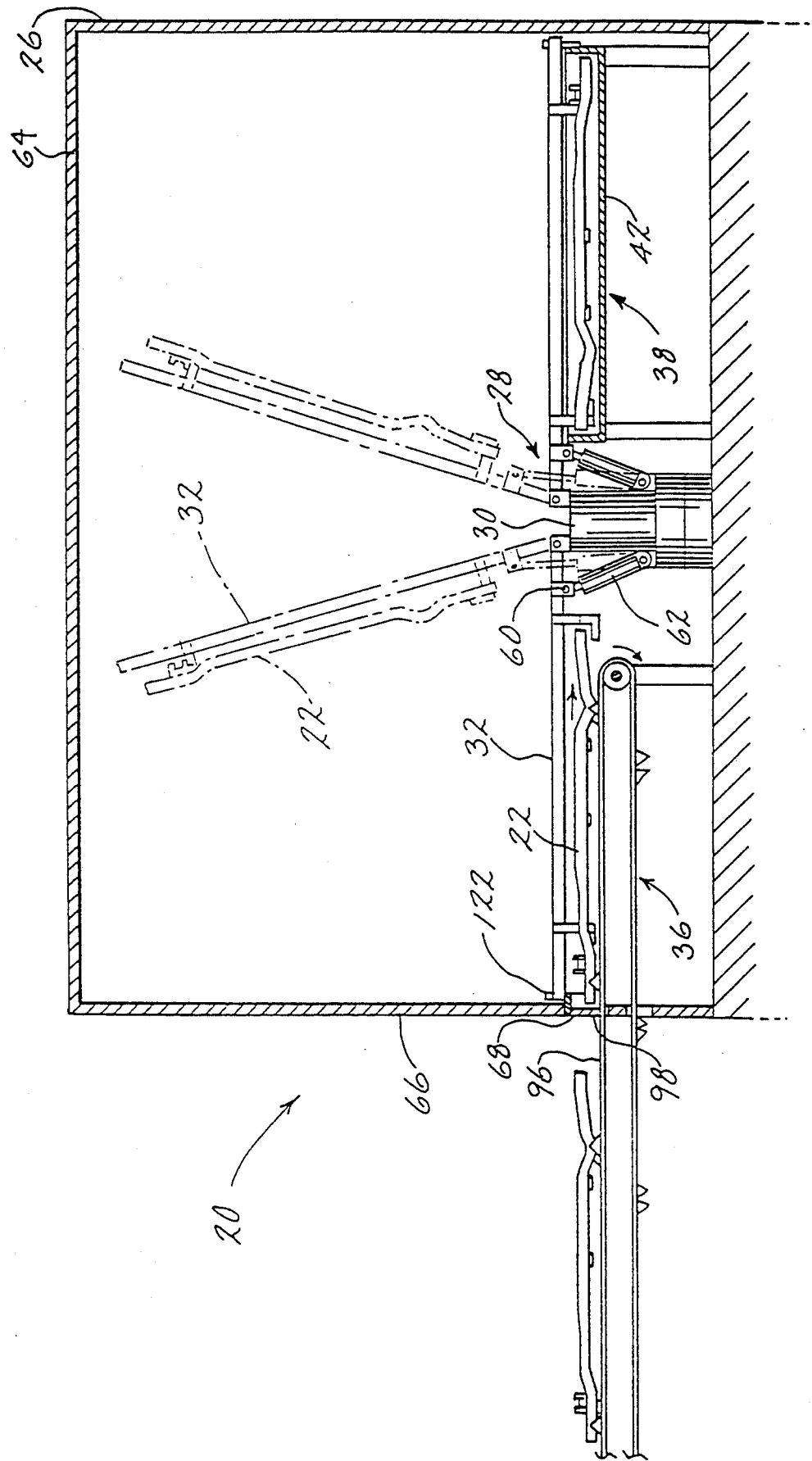
FIG. 2 is a sectional view taken along line 2—2 of FIG. 1

Arm 32 moves downwardly, FIG. 2, at loading station 36 to engage frame 22 and then moves upwardly to lift the frame and carry the frame during rotation of hub 30. The arm moves downwardly at each of stations 46, 48 and 38 to lower the frame into the liquid in the respective tank, and then moves upwardly to raise the frame out of such liquid in the respective tank. The arm moves downwardly at unloading station 44 to disengage the frame and then moves upwardly and rotates to loading station 36, to begin the next cycle.

Arm 32 swings in an arc about pivot point 60 at hub 30, and is actuated between its upwardly raised position as shown in phantom line and its downwardly lowered position as shown in solid line by a hydraulic cylinder 62, or alternatively is pneumatically actuated, or is raised and lowered by a cable, chain, or the like. Frame 22 at loading station 36 is attached in a generally horizontal position to arm 32. The frame is likewise detached in a generally horizontal position from the arm at unloading station 44. The frame is lowered by the arm into the respective tanks at stations 46, 48 and 38 in a generally horizontal position in the respective tank. The horizontal loading, dipped and unloading positions of the frame are all substantially coplanar.

Frame 22 has a longitudinal extent of a given length. As seen in FIG. 2, building 26 has a height to roof 64 substantially less than twice the length of frame 22. The transport mechanism provided by carousel 28 moves frame 22 through stations 36, 46, 48, 38 and 44 such that the longitudinal extent of frame 22 is substantially horizontal. The raising and lowering of frame 22 into and out of the tanks at stations 46, 48 and 38 defines a travel path having a vertical height substantially less than twice the length of the frame. Building 26 has a sidewall 66 with an entrance opening 68 therethrough, FIGS. 1, 2 and 11, at loading station 36, and an exit opening 70 therethrough at unloading station 44. Frame 22 is passed longitudinally through such openings in a generally horizontal position into and out of building 26, such that openings 68 and 70 have minimum dimensions, to minimize heat loss from the building.

At drip station 50, uncoated excess liquid is allowed to drip from the frame. Additionally or alternatively, uncoated excess liquid is allowed to drip from the frame above tank 42 at coating station 38. The amount of pivoting of the transport arm varies the tilt angle, to provide an adjustable drip angle of the frame. This is particularly desirable because it enables a selectively chosen drip angle, which in some instances may be vertical, or in other instances at a diagonal angle relative to horizontal. The latter is preferred to prevent drips from one of the lateral cross pieces of the frame from dripping onto another lateral cross piece therebelow. The pivoted transport arm thus moves the frame through the coating station into and out of contact with the coating liquid and raises the frame after such coating to a tilted position such that the longitudinal extent of the frame is tilted at an angle relative to horizontal.

Figure 3:
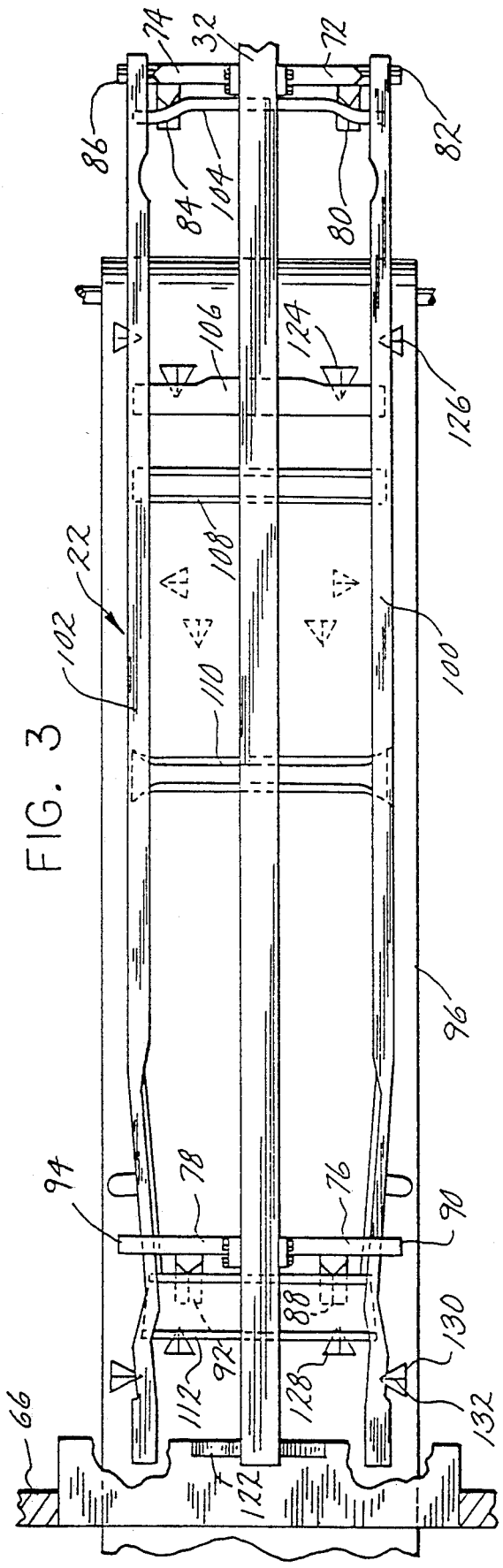
FIG. 3 is an enlarged top view of a portion of the structure of FIG. 1.
Figure 4:
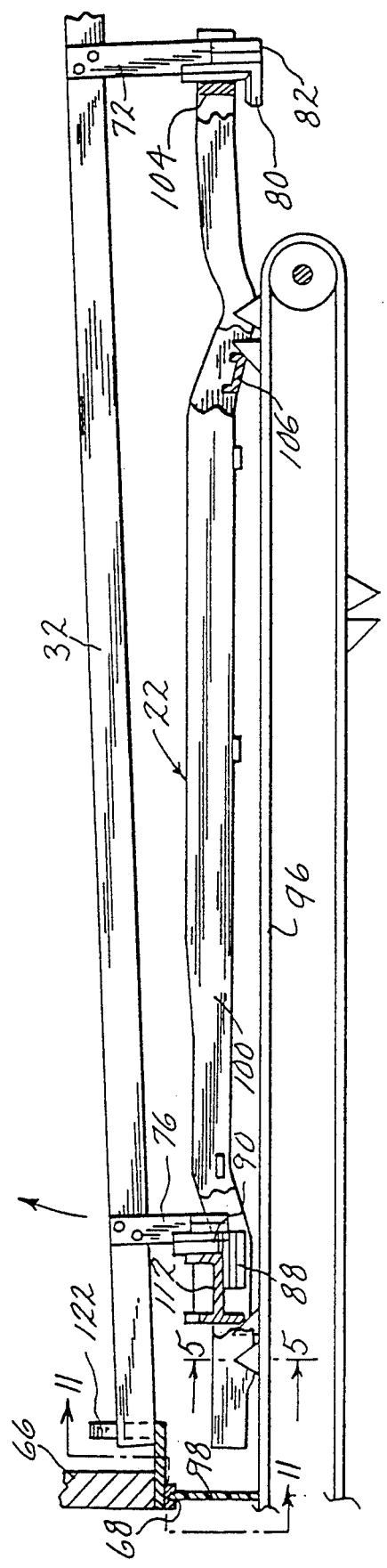
FIG. 4 is a side view of the structure in FIG. 3.

Hands 72, 74, 76, 78, FIGS. 3 and 4, extend from arm 32 and have fingers 80, 82, 84, 86, 88, 90, 92, 94 engaging frame 22. Frame 22 is attached to the fingers at loading station 36. A conveyance mechanism provided by continuous belt conveyor 96 carries frame 22 longitudinally horizontally through flexible hanging leaves 98 at opening 68 in building wall 66 to loading station 36. Conveyor 96 carries frame 22 rightwardly, FIGS. 1–4, to a first position. Arm 32 is swung downwardly, with at least some of the noted fingers moving downwardly past and below frame 22. Conveyor 96 then carries frame 22 further rightwardly, advancing frame 22 to a second position above the last mentioned fingers, such that upon swinging arm 32 upwardly, such last mentioned fingers engage the underside of frame 22 and lift same.

Frame 22 is a generally flat planar member having a pair of longitudinal sides 100 and 102, FIG. 3, and a plurality of lateral cross pieces such as 104, 106, 108, 110, 112. Fingers 80 and 84 engage the underside of cross piece 104. Fingers 82 and 86 engage the underside of longitudinal sides 100 and 102, respectively. Fingers 88 and 92 engage the underside of cross piece 112. Fingers 90 and 94 engage the top side of longitudinal sides 100 and 102, respectively. The noted engagement locates the longitudinal sides of the frame and the respective cross pieces of the frame, to precisely locate the frame both longitudinally and laterally.

The fingers are formed with a knife edge laterally crossing the respective portion of the frame, for example as shown at knife edges 114 and 116 for respective fingers 80 and 82 in FIGS. 6 and 7, and knife edges 118 and 120 for respective fingers 88 and 90 in FIGS. 8–10. The lower fingers 80, 84, 88, 92 are slightly angled, such that when arm 32 is in the lowered position, the lower fingers tilt upwardly leftwardly and engage only an edge of the frame to provide only point contact therewith, to enhance the coating of the frame. The lateral lower fingers 82 and 86 and the lateral upper fingers 90 and 94 extend laterally across the longitudinal sides of the frame and are likewise angled, as shown in FIG. 7 for finger 82, and in FIGS. 9 and 10 for finger 90, to also provide only point contact with the frame, to enhance coating of the frame. The noted lower longitudinal fingers are tilted sufficiently relative to the respective hands such that arm 32 may be lowered to a position slightly beyond horizontal, FIG. 4, and the lower fingers will still engage and lift frame 22. In a further embodiment, finger 90 has an upwardly extending portion 121 facilitating stacking of frames. In this latter embodiment, two or more frames are carried on carousel arm 32, such that two or more frames are dipped during each dipping step, etc. In this embodiment, edge 120 does not engage the top of the frame therebelow, but rather locates the siderails of the frame outboard thereof, and edge 121 is spaced slightly inwardly of the frame siderail.

Stationary V-shaped structure 122, FIG. 11, is provided at loading station 36 and spaced above conveyor 96 and is engaged by arm 32 during downward swinging of the arm to guide and locate the arm relative to conveyor 96 and frame 22. Conveyor 96 has a plurality of cones 124, 126, 128, 130, etc., thereon, with angled bevel surfaces forming knife edges such as 132, FIGS. 3 and 5, which extend along a diagonal angle to provide point contact with the frame. Some of the cones such as cones 126 and 130 engage the longitudinal sides of the frame, and others of the cones such as cones 124 and 128 engage lateral cross pieces of the frame. The cones space the frame above conveyor 96 and precisely locate the frame both longitudinally and laterally. In an alternate embodiment, the frame has a plurality of holes in the underside thereof, and conveyor 96 has a plurality of cones extending upwardly partially through such holes and spacing the frame above the conveyor and precisely locating the frame both longitudinally and laterally.

Unloading at station 44 is comparable but reversed in sequence from loading at station 36. A conveyor 134 is provided like conveyor 96. The transport arm of the carousel is lowered to lower the frame onto the cones on the conveyor. The above noted knife edges and angles on the fingers provide the noted point contact with the frame and minimize marring of the coating on the frame. In most applications, there is no marring because the hot melt wax coating heals itself, which healing is facilitated by the noted point contact, which minimizes the area which must be healed by continued flow of the hot melt wax coating after disengagement of the frame by the fingers. The above noted beveled surfaces and knife edges such as 132, FIG. 5, of the cones on the conveyor and the angles thereof desirably provide only point contact with the coated frame on exit conveyor 134. After the pivot arm of the carousel is lowered such that the frame now rests on the cones on conveyor 134, the latter moves slightly to partially advance the frame to allow clearance of the lower fingers, and the pivot arm is then raised upwardly, whereafter conveyor 134 carries the frame outwardly through opening 70 of the building. Opening 70 is not provided with the hanging flexible leaves such as 98 of entrance opening 68. because such leaves would drag across and mar the coating on the frame. Instead, opening 70 is provided with a quick acting guillotine door 136, FIG. 12, actuated by pneumatic cylinder 138 to quickly move vertically upwardly and downwardly. This minimizes heat loss from the building.

Figure 13:
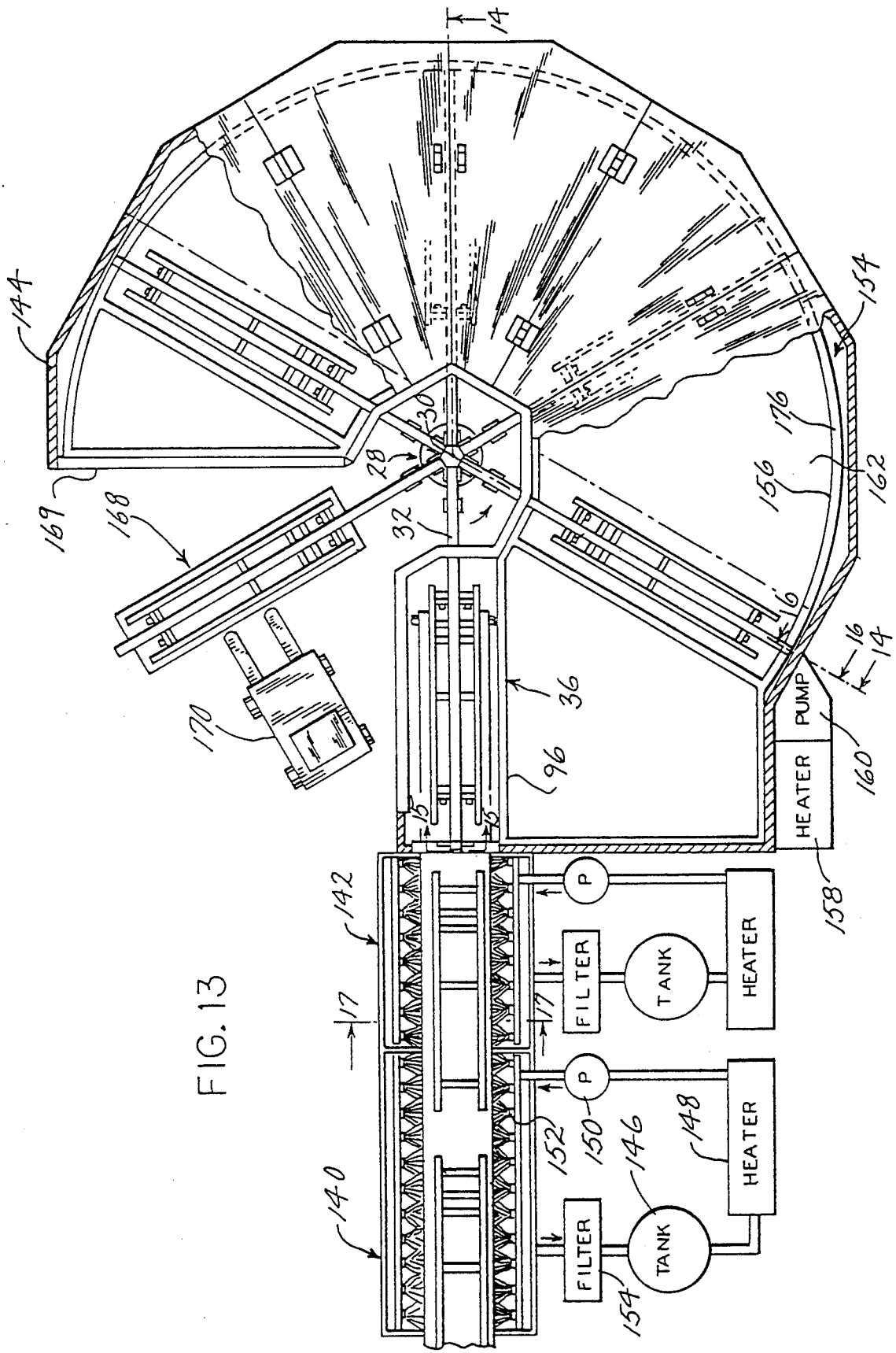
FIG. 13 is a top view of an alternate embodiment of a manufacturing facility constructed in accordance with the '346 parent application.

FIG. 13 shows a further embodiment, and like reference numerals are used from the above FIGS. where appropriate to facilitate clarity. Preheat wash and rinse stations 140 and 142 are external of building 144. Preheat wash station 140 includes a tank 146, a heater 148, a pump 150 supplying heated wash liquid to spray nozzles 152, and a return filter 154. Rinse station 142 is comparable for rinse liquid. Conveyor 96 conveys the frame horizontally longitudinally through stations 140 and 142 to provide liquid heat transfer to the frame, and then moves the frame into building 144. This movement is along the direction of the longitudinal extent of the frame. The frame is attached to pivot arm 32 as above described, and the arm swings upwardly to lift the frame from the conveyor 96.

Coating station 38 of FIG. 1 is replaced by a coating station 154 in FIG. 13 with a tank 156 which is substantially laterally circumferentially expanded to extend along a significant portion of the inner periphery of the building around hub 30. In FIG. 13, tank 156 has a semicircular shape when viewed from above. Transport arm 32 lowers the frame into and out of tank 156, as above. Transport arm 32 also moves the frame horizontally through tank 156 in a direction transverse to the longitudinal extent of the frame. The lowering and raising of the frame into and out of the tank defines a travel path having a vertical height substantially less than twice the length of the frame, as before. A heater 158 and pump 160 are provided for heating and pumping coating liquid 162 to tank 156.

Building 144 has differing heights at loading station 36 and the central portion of coating station 154. At loading station 136, the building must be high enough to allow arm 32 to pivot upwardly to lift the frame from conveyor 96. However, in the central portion of coating station 154, as shown on the right side of FIG. 14, arm 32 need only move horizontally laterally, and hence there is no need for any greater building height other than a small clearance for arm 32 above the tank. The roof of building 144 along this central portion of coating station 154 is provided by access doors 164. At the beginning of coating station 154, an increased building height is necessary as shown at roof 166 at the left side of FIG. 14, to accommodate movement of arm 32 in an upward position over tank 156 and then downward movement of arm 32 to lower the frame into tank 156. The building likewise has a higher roof at the end of coating station 154. The building thus has a first lower height at roof access door 164 over the middle of tank 156, and second higher heights as at roof 166 at the ends of the tank to permit downward and upward swinging of arm 32 to lower and raise the frame into and out of the tank. The unloading station may be provided within the building, as in FIG. 1, or an external loading station 168 may be provided with the frames remaining in a horizontal position but stacked vertically, and then periodically removed by a forklift 170 or the like. Building 144 has an external recess 169 formed in the periphery thereof at which unloading station 168 is located.

In a further embodiment, a cam track is provided in the building to assist or eliminate the pivot arm actuators such as 62. FIG. 15 shows a cam track 172 extending at least partially peripherally around central hub 30. Arm 32 has a roller 174 engaging and rolling along the cam track during rotation of hub 30 such that arm 32 is lowered and raised according to the camming profile of the cam track. The cam track has a V-shape at loading station 136 such that roller 174 rides down the V to lower the arm to engage the frame. At coating station 154, the cam track may be provided by the upper lip 176 of the tank having high lobes at the beginning and the end of the tank, and having an extended low lobe along the central portion of the tank. The horizontal circumferential length of the low lobe portion of the cam surface controls the length of horizontal travel of the frame in coating liquid 162 in tank 156 during rotation of hub 30, to control coating of the frame.

FIG. 18 shows another embodiment, and uses like reference numerals from the above FIGS. where appropriate to facilitate clarity. A servicing station 180 is spaced along the periphery of hub 30. Building 182 has an opening 184 at station 180. The carousel pivot arm is movable to a lowered position at servicing station 180, passing through opening 184 in building 182 externally of the building to external servicing location 180 for servicing of the transport pivot arm. The arm is movable to an upward position at servicing station 180 remaining within building 182 and bypassing external servicing location 180 and instead passing within building 182 to the next station therein upon rotation of hub 30. Building 182 has an external recess 186 formed therein at servicing station 180 providing the external location for servicing of the pivot arm. Thus, when servicing is desired, the pivot arm is swung downwardly through opening 184 to permit servicing, and then pivoted back upwardly through opening 184 when the servicing is completed. This allows servicing of the pivot arm externally of the building, which is desirable because the servicing technician can remain outside the building and not have to work in the elevated temperatures within the building. When servicing is not desired, the pivot arm merely remains in its upward pivoted position at station 180 without passing through opening 184.

Figure 19:
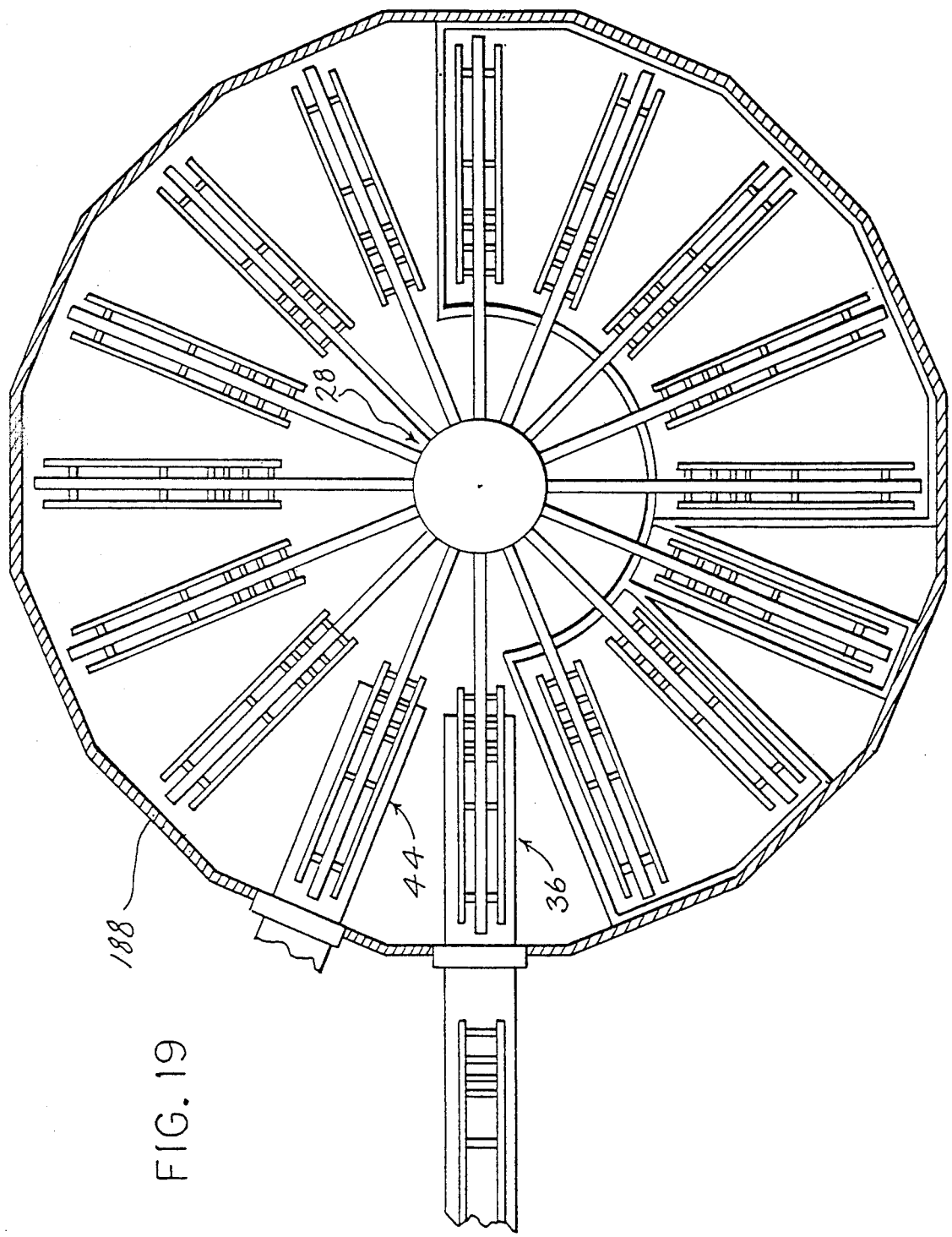
FIG. 19 is a top view of another embodiment of a manufacturing facility constructed in accordance with the '346 parent application.

FIG. 19 shows another embodiment, and like reference numerals are used from the above FIGS. where appropriate to facilitate clarity. Building 188 has an increased number of stations which may provide various desired combinations of preheat washing, rinsing, coating, and dripping between loading station 36 and unloading station 44. The carousel at the core of the building is supported independently of the building, and may be moved to different locations and buildings as desired.

Numerous alternatives are possible. For example, instead of conveying the frames to the loading station with a conveyor, other conveyance mechanisms may be used, such as a cart, a shuttle, loading from beneath rather than through a sidewall opening, etc. While plural transport pivot arm assemblies are shown, single arm assemblies may of course be used. A facility with a single station in the building may also be used, to provide only coating within the building, and to provide loading and unloading externally of the building, as well as preheating if desired. The facilities and methods disclosed may also be used in cold coating processes. In further embodiments, the motor drive for the hub may be provided at the hub within the building, or may be provided externally of the building with an outer ring for mechanical advantage enabling a smaller motor and saving the motor from the harsh environment and elevated temperatures within the building. While a single frame per pivot arm of the carousel is shown, each arm may carry and dip more than one frame at a time. For example, one frame may be carried above the arm, and another frame below the arm. Further alternatively, multiple frames may be stacked, and carried by an arm.

Figure 21:
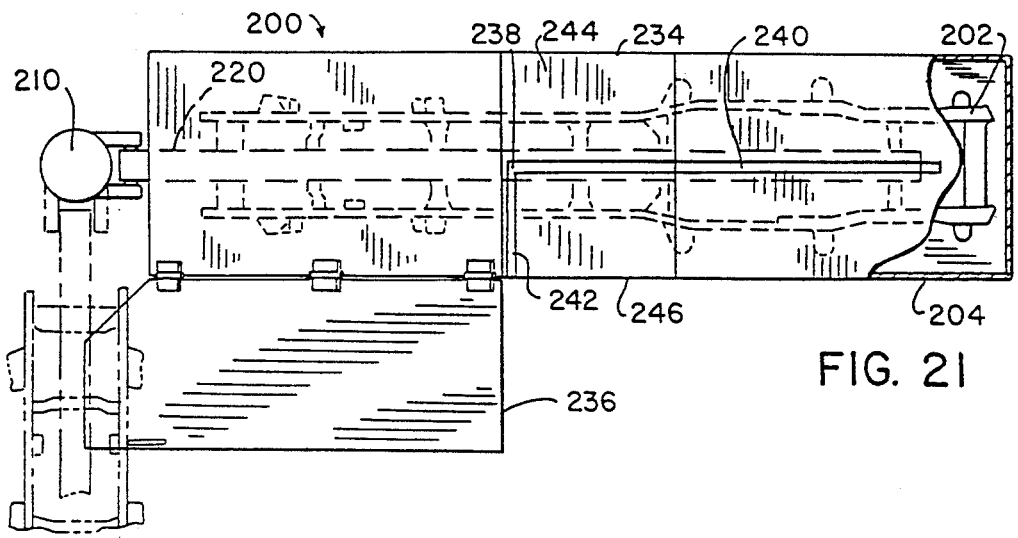
FIG. 21 is a top view of a portion of the structure in FIG. 20.
Figure 20:
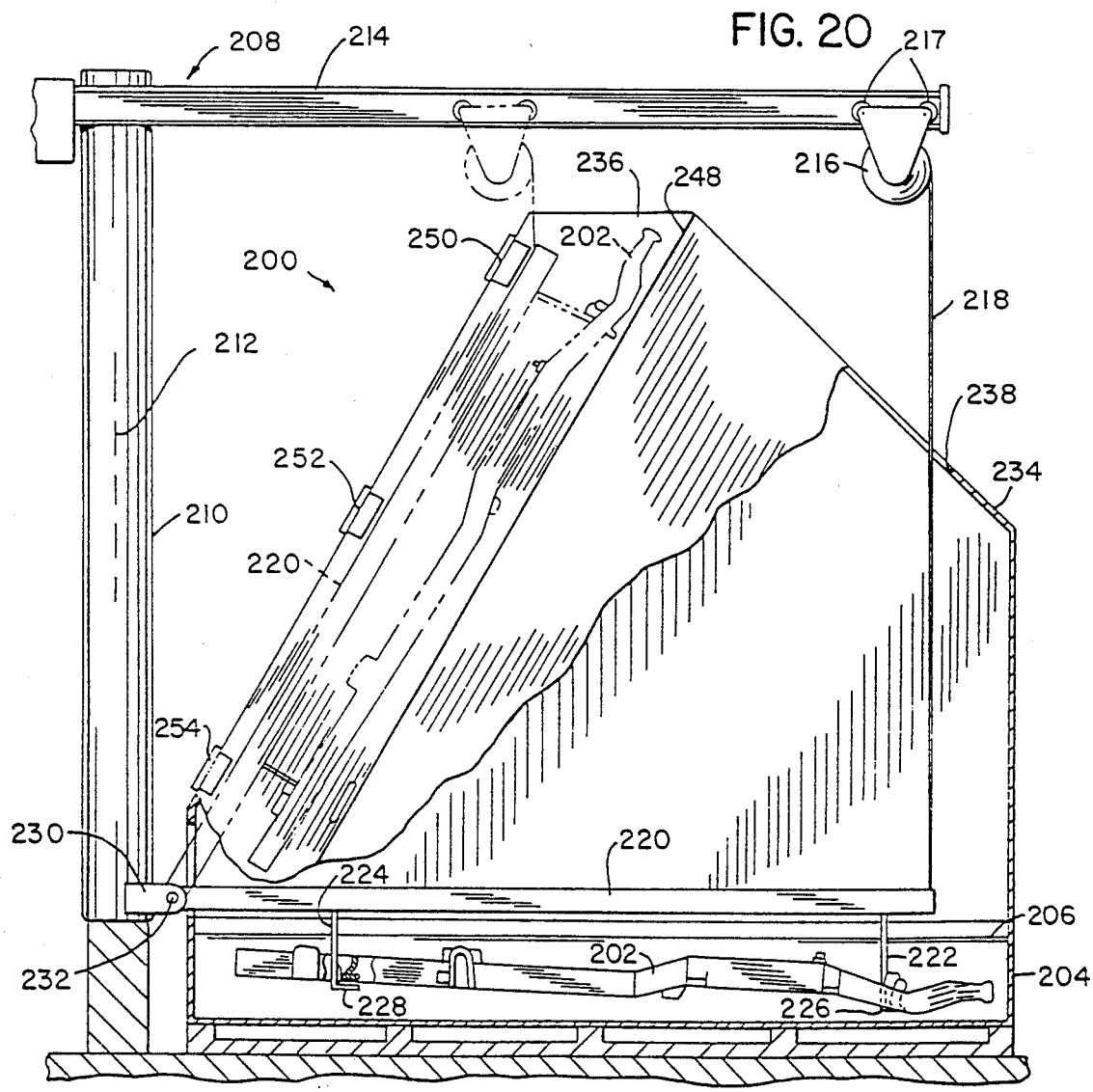
FIG. 20 is a side view of a manufacturing facility constructed in accordance with the invention of the above noted '253 parent application.

FIGS. 20 and 21 show a manufacturing facility 200 with substantially reduced space requirements for applying a coating to vehicle structural components such as frame 202. A coating station is provided by a tank 204 containing coating liquid 206. A jib crane 208 is provided by a generally vertically extending hub 210 rotational about a generally vertical axis 212, a support beam 214 extending horizontally from hub 210, and a winch pulley 216 translatable on rollers 217 along beam 214 and having a cable 218 extending downwardly. Winch pulley 216 includes a motor (not shown) for lowering and raising cable 218. A carrier arm 220 is provided for carrying frame 202, comparable to above described arms 32, 34, etc. in the '346 parent application, and is pivotally mounted to hub 210 below beam 214. Cable 218 is attached to arm 220 for moving the arm through the coating station. Arm 220 has depending hands such as 222 and 224, comparable to above described hands 72, 74, 76, 78, and fingers such as 226 and 228, comparable to above described fingers 80, 82, 84, 86, 88, 90, 92, 94, engaging frame 202.

Arm 220 pivots at mount 230 on hub 210 about a generally horizontal pivot axis 232 transverse to the direction of translation of pulley 216 along beam 214. As cable 218 is let out from winch pulley 216, arm 220 pivots downwardly about pivot axis 232, and pulley 216 translates rightwardly along beam 214 away from hub 210. The downward pivoting of arm 220 dips frame 202 into coating liquid 206 in tank 204. As cable 218 is retracted back up to pulley 216, arm 220 pivots upwardly about pivot axis 232, and pulley 216 translates leftwardly along beam 214 toward hub 210. The upward pivoting of arm 220 raises frame 202 out of coating liquid 206 in tank 204. It is preferred that pulley 216 be freely translatable on rollers 217 along beam 214. As arm 220 pivots downwardly and upwardly, it will cause right and left translation of the pulley along the beam, as cable 218 remains in a vertical position to support the weight of arm 220 and frame 202 as pulled downwardly by gravity. In another embodiment, the pulley can be further motorized to mechanically drive the pulley right and left along the beam. In a further embodiment, translation of the pulley along the beam can be limited, or the pulley can be located at a stationary position on the beam, and cable 218 will move through various angles relative to vertical as arm 220 pivots downwardly and upwardly.

A shell housing 234 is above and encloses tank 204. Housing 234 has a door 236 permitting entry and exit of arm 220 and frame 202. Housing 234 has a slot 238 through which cable 218 extends. The slot has a given configuration and extension permitting translation of cable 218 therealong as pulley 216 translates along beam 214. Slot 238 has a generally L-shaped configuration when viewed from above, FIG. 21. A first portion 240 of the slot extends toward and away from hub 210. A second portion 242 of the slot extends transversely to portion 240. Cable 218, arm 220 and frame 202 enter housing 234 in response to rotation of hub 210 about vertical axis 212. Cable 218, arm 220 and frame 202 enter housing 234 along a direction transverse to the direction of lowering and raising of frame 202 into and out of tank 204. Housing 234 has a top wall 244 in which slot 238 is formed, and has a sidewall 246 extending downwardly from the top wall. The sidewall has an opening 248 therein covered by door 236 mounted to the housing at hinges 250, 252 and 254. Arm 220 and frame 202 enter the housing through opening 248 in the housing sidewall. Arm 220 translates frame 202 horizontally during rotation of hub 210 to a position above tank 204. Arm 220 then lowers frame 202 into the tank to a generally horizontal position for coating of the frame. Arm 220 then raises the frame out of the tank, and hub 210 is rotated in the opposite direction such that arm 220 and frame 202 exit the housing through opening 248 in the sidewall. Movement of frame 202 in the coating station in housing 234 defines a travel path having a vertical height substantially less than twice the length of frame 202.

Figure 22:
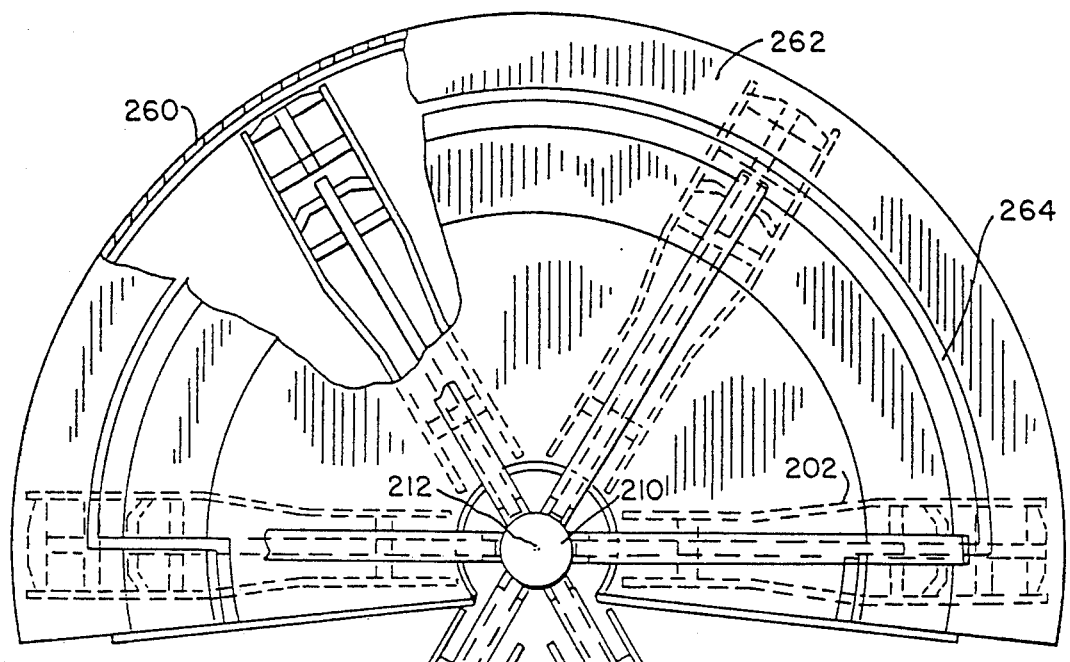
FIG. 22 is a top view of an alternate embodiment of a manufacturing facility constructed in accordance with the '253 parent application.
Figure 23:
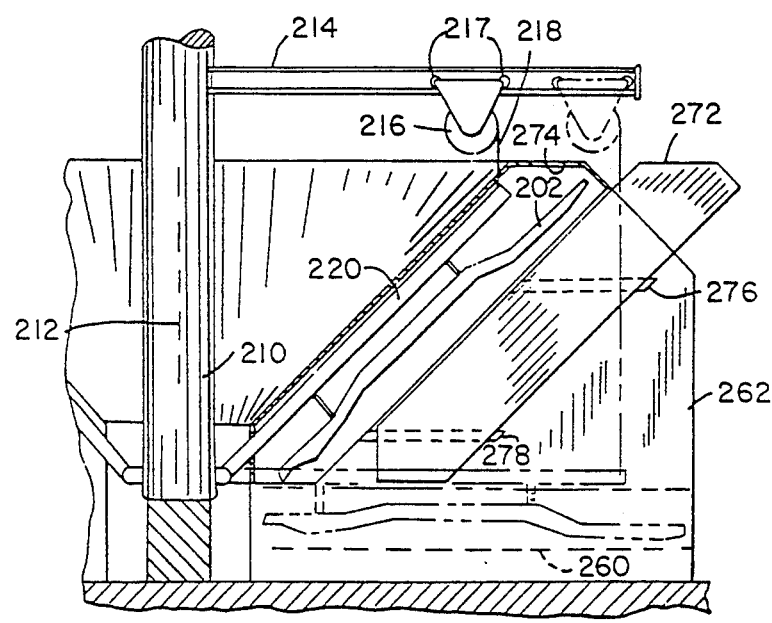
FIG. 23 is a side view of a portion of the structure of FIG. 22.

FIGS. 22 and 23 show a further embodiment and use like reference numerals from FIGS. 20 and 21 where appropriate to facilitate understanding. Tank 260 and 2 extend partially circumferentially around hub 210. Frame 202 is translated horizontally through tank 260, in a direction transverse to the longitudinal extent of the frame, in response to rotation of hub 210 about vertical axis 212. The slot in the top wall of the housing further includes an arcuate portion 264 along and above tank 260 and extending partially circumferentially around hub 210 and through which cable 218 extends when frame 202 is in its downwardly lowered position in tank 260. Cable 218 is translated along arcuate slot portion 264 as hub 210 rotates about vertical axis 212. External to the housing are a load station 266 and an unload station 268, for loading and unloading frames by a fork lift truck 270 or the like. FIG. 23 shows an alternate door 272 for covering opening 274 in the sidewall of the housing. The door is not hinged as in FIG. 20, but instead slides along tracks 276 and 278 between a rightward open position as shown, and a leftward closed position.

FIGS. 24-26 show a further embodiment and use like reference numerals from above where appropriate to facilitate understanding. Housing 280 is extended all the way around hub 210 and encloses load and unload stations 266 and 268. Tank 282 only extends partially circumferentially around the hub. The frames enter and exit the housing on conveyors 284 and 286 as in the '346 parent application. The housing has a sidewall 288, FIG. 25, with an entrance opening 290 therethrough at loading station 266, and has hanging flexible leaves 292, as in the parent application, FIG. 11. Sidewall 288 of the housing has an exit opening 294, FIG. 26, therethrough with a quick acting guillotine door 296 actuated by pneumatic cylinder 298 to quickly move vertically upwardly and downwardly, as in the '346 parent application, FIG. 12. The frames pass longitudinally through the entrance and exit openings in a generally horizontal position into and out of the housing. Openings 290 and 294 have minimum dimensions, to minimize heat loss from the housing. Also, multiple frames may be carried by an arm.

In other embodiments, the facility has different numbers of arms and/or tanks, including wash and rinse tanks as noted above.

Present Invention

FIG. 27 shows a manufacturing facility including a building 300 housing a transport mechanism 302 provided by a rotary carousel 304 having a central hub 306 rotatable about a vertical axis 308 and having a plurality of arms 310 each carrying one or more stacked vehicle structural components 312, such as frames, each having a longitudinal extent of given length. The facility includes a loading station 314, a coating station 316 including a dip tank 318 containing coating liquid 320, FIG. 28, a drip station 322, and an unloading station 324. Arms 310 are pivoted to hub 306 at trunions 326, FIG. 28, to pivot about a horizontal pivot axis 328 and swing in an arc in a vertical plane.

Vehicle structural component 312 is loaded to transport mechanism 302 at loading station 314, and then transported by transport mechanism 302 to coating station 316. Vehicle structural component 312 is moved through coating station 316 in a horizontal position such that the longitudinal extent of the vehicle structural component is substantially horizontal, as in the above noted parent applications. The vehicle structural component is then transported through drip station 322 to unloading station 324 and is unloaded in a generally horizontal position below the unloading station, FIG. 29. Additional vehicle structural components are transported to the unloading station and unloaded and stacked in a horizontal position on the vehicle structural component therebelow to provide a stack of horizontal vehicle structural components stacked vertically and disposed below the unloading station.

A given number of vehicle structural components are stacked below the unloading station, and upon completion of the stacking, the stack of vehicle structural components is transported from below the unloading station. For example, FIG. 30 shows six vehicle structural components which had been stacked below the unloading station in FIG. 29 and then transported rightwardly externally of building 300 to the position shown in FIG. 30. In the embodiment in FIGS. 27-30, the loading station, coating station and unloading station are at ground level, and an excavation 330, FIGS. 29 and 30, is provided below ground level at the unloading station. The vehicle structural components are stacked in excavation 330 below the unloading station.

In FIG. 29, a stacking station 332 in excavation 330 includes a stacking mechanism 334, provided by a scissors jack. The stacking mechanism can roll left and right on wheels 336 rolling on horizontal track 338 as pulled by tow rope 340 on motor driven pulleys 342. Vehicle structural component 312 is detached from transport mechanism arm 310 and lowered in a horizontal position at stacking station 332 by stacking mechanism 334 below unloading station 324. A second vehicle structural component, which had been attached to the transport mechanism at the loading station and transported through the coating station and the drip station, is stacked in a horizontal position on the first vehicle structural component and detached from arm 310 of the transport mechanism. The first and second vehicle structural components are lowered in the horizontal position at stacking station 332 below unloading station 324. A third vehicle structural component, which had been attached to the transport mechanism at the loading station and moved through the coating station and the drip station, is transported to the unloading station and stacked on the second vehicle structural component and detached from arm 310 of the transport mechanism. The first, second and third vehicle structural components are lowered in a horizontal position at stacking station 332 below unloading station 324. The above steps are repeated a desired number of times to provide a plurality of horizontally extending vehicle structural components stacked vertically at stacking station 332 below unloading station 324.

The scissors jack provides a stacking mechanism which is raised to engage vehicle structural component 312 and lift same from fingers 344 of hands 346 of arm 310 of the transport mechanism. Stacking mechanism 334 is then rolled rightwardly through a distance at least as long as fingers 344, FIG. 29, to detach vehicle structural component 312 from the transport mechanism, and to enable arm 310 of the transport mechanism to swing back upwardly and rotate clockwise to loading station 314, FIG. 27. Stacking mechanism 334 is then lowered and moved horizontally leftwardly to return to an alignment position to receive the second vehicle structural component such that the first vehicle structural component engages the second vehicle structural component thereabove at the unloading station and lifts the second vehicle structural component from fingers 344 of hands 346 of arm 310 of the transport mechanism, to detach the second vehicle structural component from the transport mechanism. Stacking mechanism 334 is then moved horizontally rightwardly, and arm 310 is pivoted upwardly, and stacking mechanism 334 is lowered and moved horizontally leftwardly to return to an alignment position to receive the third vehicle structural component such that the second vehicle structural component engages the third vehicle structural component at the unloading station and lifts the third vehicle structural component from the transport mechanism to detach same. The above steps are repeated a desired number of times to provide a desired number of stacked vehicle structural components below unloading station 324.

Arm 310 moves downwardly at loading station 314 to engage vehicle structural component 312, and then moves upwardly at the loading station to lift the vehicle structural component and carry same during rotation of hub 306. Arm 310 is moved downwardly at the coating station to dip the vehicle structural component into coating liquid 320, FIG. 28, and then upwardly at the coating station, and then downwardly at unloading station 324 to disengage the vehicle structural component as stacking mechanism 334 engages the vehicle structural component. Arm 310 is then moved upwardly at the unloading station, and hub 306 is rotated to move arm 310 to loading station 314, to repeat the cycle.

Arm 310 is moved downwardly at unloading station 324 until stacking mechanism 334 engages the vehicle structural component. In one embodiment, arm 310 continues to move downwardly with a slight amount of overtravel to disengage the vehicle structural component, whereafter stacking mechanism 334 moves horizontally rightwardly, whereafter arm 310 moves upwardly at unloading station 324, and hub 306 rotates to move arm 310 to loading station 314. In another embodiment, arm 310 moves downwardly at unloading station 324 to a given position, and stacking mechanism 334 moves upwardly and engages the vehicle structural component and lifts the vehicle structural component from the arm, whereafter stacking mechanism 334 moves horizontally, and arm 310 moves upwardly at unloading station 324, and hub 306 is rotated to move arm 310 to loading station 314.

The frames are stacked and aligned with guide pins 348, FIG. 31. Another type of guide pin 350, FIG. 32, includes a tapered frusto-conical surface 352 supporting and spacing the upper vehicle structural component above the lower vehicle structural component. Another type of stacking and spacing pin 354 is shown in FIG. 33.

An oscillating mechanism is provided for oscillating vehicle structural component 312 in coating liquid 320 in dip tank 318. This accelerates heat transfer, and also improves coating by eliminating air pockets. Arm 310 is raised and lowered by a cable 356 extending around a pulley 358 and driven by a cable winch pulley drive 360. Pulley 358 is eccentrically mounted on a wheel 362 on hub 306. Pulley 358 is stroked upon rotation of wheel 362, to in turn stroke cable 356, and in turn stroke arm 310 up and down, and in turn oscillate vehicle structural component 312 up and down in coating liquid 320 in tank 318. In another embodiment, pulley 358 is not oscillated, but instead the winch pulley drive 360 is operated in periodic forward and reverse directions to stroke cable 356 and provide oscillation of vehicle structural component 312 in tank 318.

Hub 306 includes a lower annular flange 364 having a toothed outer periphery to provide a gear driven by drive gear 366 of drive motor 368. The underside of flange 364 is supported on bearings 370 mounted to lower support trunions 372. Hub 306 rotates about a center vertical stalk 374 and is guided by bearings 376 mounted to trunions 378 on the undersurface of flange 364.

In FIG. 34, a transport mechanism 400 is provided by a rotary carousel 402 having a central hub 406 rotatable about a vertical axis 408 and having a plurality of arms 410, FIG. 35, pivotally mounted to hub 406 to pivot about horizontal pivot axis 412 and swing in an arc in a vertical plane. A plurality of rigid stationary spokes provided by support beams 414 extend radially outwardly from hub 406 and are connected adjacent their outer ends by a circumferential support bar 416, FIG. 34, which rides on bearings 418, FIG. 35, supported by trunions 420 mounted to the sidewall of building 422. Arm 410 is raised and lowered by a cable 424 extending around pulley 426 journaled to support beam 414. The pulley is driven by winch pulley drive 428 at the outer end of support beam 414. One or more stacked vehicle structural components 430 are carried on arm 410 at fingers 432 of hands 434, as above. The carousel rotates from loading station 401a to preheat wash station 401b to preheat rinse station 401c to coating station 401d to drip station 401e to unloading station 401f, and then back to the loading station to repeat the cycle.

An oscillating mechanism 436, FIG. 35, engages the outer end of arm 410 and oscillates arm 410 up and down about pivot point 412 to move vehicle structural components 430 up and down in coating liquid 438 in dip tank 440. The oscillating mechanism is provided by an eccentric cam 442 on shaft 444 driven by motor 446 and engaging roller 448, FIGS. 35 and 36, mounted to the underside of arm 410 by trunion 450. Rotation of cam 442 by motor shaft 446 strokes the outer end of arm 410 up and down.

In another embodiment, the oscillating mechanism is provided by mounting winch pulley drive 428, FIG. 35, on an extensible and retractable cylinder 452, FIG. 37, at the end of support beam 414. FIG. 37 also shows a longer support beam 414 extending externally of building 422. Extension and retraction of cylinder 452 strokes winch pulley 428 horizontally rectilinearly back and forth to stroke cable 424, and oscillate arm 410 up and down while vehicle structural components 430 are in tank 440. In another embodiment, winch pulley 428 is alternately driven in opposite directions to raise and lower cable 424 and provide the noted oscillation.

FIG. 38 shows a further embodiment including a pair of guide bars 454 and 456 extending downwardly from and on opposite sides of arm 410 for engaging guide surfaces 458 and 460 straddling tank 440 to guide and center the vehicle structural components as they are dipped into coating liquid 438 in tank 440. Guide bars 462, FIG. 35, may also be mounted to support beam 414 to locate arm 410 at the upper end of its swing arc travel and hold same in place as hub 406 rotates.

FIG. 39 shows another oscillating mechanism 464 including a motor 466 driving a shaft 468 having a link 470 pivotally connected to rod 472 to move holder 474 up and down along track 476, FIG. 40. Holder 474 receives the outer end of arm 410 to move the latter up and down, and oscillate vehicle structural components 430 in tank 440. Holder 474 includes sloped guidewalls 478 for centering and retaining arm 410.

In FIG. 41, the rotary carousel of the transport mechanism has a bent arm 480 having a first portion 482 extending upwardly and a second portion 484 extending outwardly from first portion 482 and forming an elbow 486 therewith at a given angle 488. Arm 480 is pivoted at portion 482 to hub 406 to swing in an arc about horizontal pivot axis 489. The arm includes a plurality of hands 490 extending downwardly from portion 484 and having lower fingers 492 engaging one or more stacked vehicle structural components 430. Downward swinging of arm 480 lowers vehicle structural components 430 into tank 440. Portion 484 of arm 480 is spaced above the horizontal plane of pivot axis 489 when vehicle structural components 430 are in tank 440. Angle 488 of elbow 486 is selected such that pivot axis 489 is substantially coplanar with the center of the stack of vehicle structural components 430. This provides more nearly vertical travel of vehicle structural components 430 into and out of tank 440 as the vehicle structural components are being dipped in coating liquid 438. This in turn provides more uniform coating by minimizing the differential travel path length and time between inner and outer ends 430a and 430b of the vehicle structural components. The straightening of the swing arc in tank 440 to a more nearly vertical direction also enables a tank of smaller radial length, with reduced clearances 494 and 496 between the tank walls and the ends 430a and 430b of the vehicle structural components.

In FIG. 42, triangular shaped arm 500 carries vehicle structural components 430. Parallelogram linkage 502 pivotally mounts arm 500 to hub 406 such that the parallelogram linkage pivots about hub 406 and swings up and down in an arc in a vertical plane and such that arm 500 moves up and down in the vertical plane along a travel path including a given range of motion immediately above dip tank 440 which is substantially parallel to vertical axis 408. Vehicle structural components 430 have a longitudinal extent of given length between longitudinal ends 430a and 430b. Downward pivoting and swinging of parallelogram linkage 502 and consequent downward movement of arm 500 lowers vehicle structural components 430 into tank 440 in a generally horizontal position such that the longitudinal extent of the vehicle structural components is substantially horizontal. Upward pivoting and swinging of parallelogram linkage 502 and consequent upward movement of arm 500 raises vehicle structural components 430 out of tank 440 in a generally horizontal position. The lowering and raising into and out of tank 440 is in the noted given range of motion substantially parallel to vertical axis 408 such that both longitudinal ends 430a and 430b of vehicle structural components 430 enter tank 440 and coating liquid 438 substantially simultaneously and leave the tank and liquid substantially simultaneously and have substantially the same travel path length and time in the coating liquid in the tank. This provides uniform coating because outer end 430b does not enter coating liquid 438 later than inner end 430a, nor does outer end 430b have a longer swing arc travel path in coating liquid 438 than inner end 430a. This also enables the noted minimum clearances 494 and 496, and hence a minimum radial length tank 440, since the latter does not have to accommodate the horizontal component otherwise present in the swing arc of arm 500 and vehicle structural components 430. This maximum, uniform vertical motion along the entire length of the vehicle structural component between the ends 430a and 430b also provides maximum, uniform heat transfer along the length of the vehicle structural component.

Parallelogram linkage 502 includes an upper link 504 and a lower link 506 each having a respective inner end 504a and 506a pivotally connected to hub 406, and each having a respective outer end 504b and 506b pivotally connected to arm 500. Upper link 504 is shorter than lower link 506. Arm 500 moves along its travel path upwardly from tank 440 through the noted given range of motion parallel to vertical axis 408 and then continues to move upwardly through an upper range of motion wherein arm 500 swings in an arc 508 nonparallel to vertical axis 408. During the upper range of motion of arm 500 along swing arc 508, upper link 504 pivots through a greater angle to dashed line position 510 than the angle of pivoting of lower link 506 to dashed line position 512. During the noted given range of motion, upper and lower links 504 and 506 pivot through about the same angle from the respective solid line positions shown to respective dashed line positions 509 and 511. Hub 406 has an extended trunion 514 extending outwardly towards arm 500 and pivotally mounting inner end 504a of upper link 504.

Winch pulley 428, FIG. 35, is driven by a motor 520, FIG. 34, carried on support beam 414. In another embodiment, winch pulley 428 is externally driven by a motor 522, FIG. 43, driving through belt 524 a flywheel assembly 526 to in turn rotate driveshaft 528. Motor mount 530 rests on plate 532 which also has a journal bearing 534 receiving driveshaft 528 rotating therein. Plate 532 is mounted by blocks 536 and 538 on slide bar 540 to slide horizontally left and right therealong as controlled by shift lever 542. Leftward and rightward movement of motor mount 530 and driveshaft 528 moves coupler 544 on the end of driveshaft 528 into and out of engagement with coupler 546 of winch pulley 428, to in turn drive the latter.

In FIG. 44, arm 410 is oscillated by a crank lever 550 pivoted at 552 and having at one end a roller 554 engaging the underside of arm 410, and having its other end driven by a rod 556 extending from eccentric link 558 on rotary shaft 560 driven by motor 562.

In FIG. 45, rotary carousel 570 includes central hub 572 rotatable about a vertical axis 574 and having a plurality of arms 576 pivotally mounted to the hub to pivot in a vertical swing plane about a horizontal pivot axis 578, FIG. 46. A plurality of rigid stationary spokes provided by support beams 580 extend radially outwardly from the hub and are connected by a circumferential support bar 582. The carousel rotates the arms from loading station 584 to coating station 586 to drip station 588 to unloading station 590. One or more stacked vehicle structural components 592 are carried on arms 576. The arms are raised and lowered by a cable 594 extending around pulley 596 and driven by winch pulley 598.

The loading station, coating station, drip station, and unloading station are all elevated above ground level. The vehicle structural components are stacked at ground level below the unloading station. Drip station 588 includes a channel 600 for receiving excess coating liquid which is then recirculated by pump 602 back to tank 604 at coating station 586. Vapors are vented at 606. The outer end of arm 576 is stroked by lever 608, FIG. 47, pivoted at 610 and driven by cylinder 612, to oscillate vehicle structural component 592 in coating liquid 614 in tank 604. The carousel is driven to rotate by an external chain drive 616 engaging spaced teeth 618, FIG. 48, along circumferential support bar 582. A motor connection 620 drives a drive sprocket 622 to drive chain 624 around idler sprocket 626. Between the sprockets, chain 624 engages and drivingly advances teeth 618 on circumferential bar 582 to thus rotate the carousel.

A stacking mechanism 630, FIGS. 49 and 50, is provided by an elevator which raises and lowers vehicle structural components 592 at the loading and unloading stations. The stacking mechanism has a pair of vertical upstanding sides 632 and 634 having respective carriages 636 and 638 vertically slidable therealong. Cylinders 640 and 642 have extensible and retractable plunger rods 644 and 646 with gear wheels 648 and 650 on the end thereof which engage respective stationary toothed racks 652 and 654 on respective sides 632 and 634. Gear wheels 648 and 650 also engage respective toothed racks 656 and 658 on movable carriages 636 and 638. When plunger rods 644 and 646 are extended upwardly, gear wheel 648 rotates clockwise along stationary rack 652, and gear wheel 650 rotates counterclockwise along stationary rack 654, to thus respectively drive movable racks 656 and 658 upwardly, and hence drive respective carriages 636 and 638 upwardly to the respective dashed line positions 637 and 639 shown in FIG. 50. The upward motion is aided by counterweights 660 and 662 connected by respective cables 664 and 666 to respective carriages 636 and 638 by pulleys 668, 670 and 672, 674. When carriages 636 and 638 move upwardly, respective counterweights 660 and 662 move downwardly. The carriages have inwardly extending support shelves 676 and 678 engaging the undersurface of the sides of vehicle structural component 592.

The stacking mechanism is raised such that shelves 676 and 678 move to respective upper dashed line positions 677 and 679 and engage vehicle structural component 592 and lift same off fingers 680, FIG. 49, of hands 682 of arm 576, and/or arm 576 has a slight amount of overtravel, to provide the above noted disengagement. Shelves 676 and 678 are then moved horizontally rightwardly in FIG. 49 by respective cylinders 684 and 686. Shelves 676 and 678 are mounted by respective bearings 688 and 690 in horizontal tracks 692 and 694 on the inner sides of carriages 636 and 638. The unloading and stacking sequence below the unloading station is as previously described. When a given number of vehicle structural components are stacked, the stack is lowered onto conveyor belt 696 and then horizontally transported from below the unloading station.

In FIG. 51, rotary carousel 700 has a central hub 702 rotatable about a vertical axis and having an arm 704 pivotally mounted thereto to swing in a vertical plane about a horizontal pivot axis 706. Arm 704 is raised and lowered by cable 708 driven by winch pulley 710. A combined loading and unloading station 712, a wash station 714, a rinse station 716, and a coating station 718 are peripherally spaced around hub 702. Vehicle structural component 720 is attached to arm 704 at combined loading and unloading station 712, and hub 702 is rotated clockwise to move arm 704 to wash station 714 then to rinse station 716 then to coating station 718 to coat vehicle structural component 720. Hub 702 is then rotated in the opposite direction, i.e., counterclockwise, to move arm 704 back to the combined loading and unloading station 712 for detachment. Another vehicle structural component is mounted to the arm at station 712, and the cycle is repeated. Coating station 718 includes a tank containing coating liquid, as above. Arm 704 is moved downwardly at the combined loading and unloading station 712 to engage vehicle structural component 720, and the arm is then moved upwardly at station 712, and hub 702 is rotated clockwise. Arm 704 is moved downwardly and then upwardly at each of stations 714, 716 and 718. Vehicle structural component 720 is attached and detached in a generally horizontal position at station 712, and is lowered at each of stations 714, 716 and 718 to a generally horizontal position.

In FIG. 52, the loading and unloading functions are split so that station 712 is the loading station, and station 722 is the unloading station. Hub 702 is rotated clockwise to unloading station 722, and then rotated in the opposite direction, i.e., counterclockwise, back to loading station 712, and the cycle is repeated.

It is recognized that various equivalents, alternatives and modifications are possible within the scope of the appended claims.

I claim:

1. A manufacturing method for applying a coating to vehicle structural frames having a longitudinal extent of a given length, comprising:
   providing a transport mechanism;
   providing a loading station;
   providing a coating station having a coating liquid;
   providing a unloading station;
   loading a vehicle structural frame to said transport mechanism at said loading station;
   transporting said vehicle structural frame to said coating station, and moving said vehicle structural frame through said coating station in a horizontal position such that said longitudinal extent of said vehicle structural frame is substantially horizontal;
   transporting said vehicle structural frame to said unloading station and unloading said vehicle structural frame in a generally horizontal position below said unloading station;
   transporting additional vehicle structural frames from said loading station through said coating station to said unloading station and unloading said vehicle structural frames and stacking each vehicle structural frame in a horizontal position on the vehicle structural frame therebelow to provide a stack of horizontal vehicle structural frames stacked vertically and disposed below said unloading station.

2. The method according to claim 1 comprising stacking a plurality of said vehicle structural frames below said unloading station, and upon completion of said stacking, transporting the stack of vehicle structural frames from below said unloading station.

3. The method according to claim 2 comprising providing said loading station, said coating station, and said unloading station at ground level, providing an excavation below ground level at said unloading station, stacking said vehicle structural frames in said excavation below said unloading station.

4. The method according to claim 2 comprising stacking said vehicle structural frames at ground level below said unloading station, and elevating said loading station, said coating station, and said unloading station above ground level.

5. A manufacturing method for applying a coating to vehicle structural frames having a longitudinal extent of a given length, comprising:
   providing a transport mechanism;
   providing a loading station;
   providing a coating station having a coating liquid;
   providing an unloading station;
   providing a stacking station below said unloading station;
   attaching a first vehicle structural frame to said transport mechanism at said loading station;

transporting said first vehicle structural frame to said coating station, and moving said first vehicle structural frame through said coating station in a horizontal position such that said longitudinal extent of said first vehicle structural frame is substantially horizontal;

transporting said first vehicle structural frame to said unloading station;

detaching said first vehicle structural frame from said transport mechanism;

lowering said first vehicle structural frame in a horizontal position at said stacking station below said unloading station;

attaching a second vehicle structural frame to said transport mechanism at said loading station;

transporting said second vehicle structural frame to said coating station, and moving said second vehicle structural frame through said coating station in a horizontal position such that said longitudinal extent of said second vehicle structural frame is substantially horizontal;

transporting said second vehicle structural frame to said unloading station;

stacking said second vehicle structural frame in a horizontal position on said first vehicle structural frame;

detaching said second vehicle structural frame from said transport mechanism;

lowering said stacked first and second vehicle structural frames in a horizontal position at said stacking station below said unloading station;

attaching a third vehicle structural frame to said transport mechanism at said loading station;

transporting said third vehicle structural frame to said coating station, and moving said third vehicle structural frame through said coating station in a horizontal position such that said longitudinal extent of said third vehicle structural frame is substantially horizontal.

6. The method according to claim 5 comprising providing a stacking mechanism at said stacking station, raising said stacking mechanism to engage said first vehicle structural frame at said unloading station and lift said first vehicle structural frame from said transport mechanism, and then moving said transport mechanism horizontally, to detach said first vehicle structural frame from said transport mechanism at said unloading station.

7. The method according to claim 6 comprising lowering said stack mechanism and moving said stacking mechanism horizontally to return to an alignment position to receive said second vehicle structural frame such that said first vehicle structural frame engages said second vehicle structural frame at said unloading station and lifts said second vehicle structural frame from said transport mechanism, and moving said transport mechanism horizontally, to detach said second vehicle structural frame from said transport mechanism, lowering said stacking mechanism and moving said stacking mechanism horizontally to return to an alignment position to receive said third vehicle structural frame such that said second vehicle structural frame engages said third vehicle structural frame at said unloading station and lifts said third vehicle structural frame from said transport mechanism, and moving said stacking mechanism horizontally, to detach said third vehicle structural frame from said transport mechanism, repeating the above steps to provide a plurality of horizontally extending vehicle structural frames stacked vertically at said stacking station below said unloading station.

8. The method according to claim 5 comprising providing said transport mechanism with a rotary carousel having a central hub rotatable about a vertical axis and having at least one arm thereon for carrying one or more vehicle structural frames;

transporting said vehicle structural frame from said loading station to said coating station to said unloading station by rotating said hub;

moving said arm downwardly at said loading station to engage said vehicle structural frame, and moving said arm upwardly at said unloading station to lift said vehicle structural frame and carry said vehicle structural frame during said rotating of said hub, moving said arm downwardly and then upwardly at said coating station, and moving said arm downwardly at said unloading station to disengage said vehicle structural frame as said stacking mechanism engages said vehicle structural frame, and moving said arm upwardly at said unloading station and rotating said hub to move said arm to said loading station.

9. The method according to claim 8 comprising moving said arm downwardly at said unloading station until said stacking mechanism engages said vehicle structural frame, and continuing moving said arm downwardly with a slight amount of overtravel to disengage said vehicle structural frame, moving said stacking mechanism horizontally, moving said arm upwardly at said unloading station and rotating said hub to move said arm to said loading station.

10. The method according to claim 8 comprising moving said arm downwardly at said unloading station to a given position, moving said stacking mechanism upwardly and engaging said vehicle structural frame and lifting said vehicle structural frame from said arm, moving said stacking mechanism horizontally, moving said arm upwardly at said unloading station and rotating said hub to move said arm to said loading station.

* * * * *